(12) United States Patent
Koyama et al.

(10) Patent No.: US 11,645,496 B2
(45) Date of Patent: May 9, 2023

(54) OPTIMIZATION APPARATUS AND OPTIMIZATION APPARATUS CONTROL METHOD

(71) Applicant: FUJITSU LIMITED, Kawasaki (JP)

(72) Inventors: Jumpei Koyama, Setagaya (JP); Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 957 days.

(21) Appl. No.: 16/521,680

(22) Filed: Jul. 25, 2019

(65) Prior Publication Data

US 2020/0074279 A1 Mar. 5, 2020

(30) Foreign Application Priority Data

Aug. 30, 2018 (JP) .............................. JP2018-161212

(51) Int. Cl.
*G06N 3/04* (2006.01)
*G06N 3/063* (2006.01)

(52) U.S. Cl.
CPC ........... *G06N 3/0445* (2013.01); *G06N 3/063* (2013.01)

(58) Field of Classification Search
CPC .............................. G06N 3/0445; G06N 3/063
See application file for complete search history.

(56) References Cited

U.S. PATENT DOCUMENTS

2016/0065210 A1 3/2016 Yoshimura et al.
2017/0024658 A1* 1/2017 Utsunomiya ...... G01R 33/1284
2018/0018563 A1* 1/2018 Tsukamoto ............. G06F 7/523
2018/0075342 A1 3/2018 Tamura et al.
2018/0107172 A1* 4/2018 Takatsu ............. G05D 23/1917
2018/0300287 A1* 10/2018 Okuyama ............... G06F 17/10
2020/0042570 A1* 2/2020 Tamura .................. G06N 5/003

FOREIGN PATENT DOCUMENTS

JP 2006-072691 3/2006
JP 2016-051314 4/2016
JP 2018-041351 3/2018

OTHER PUBLICATIONS

Coolen (Ising-Spin Neural Networks With Spatial Structure, 1990, pp. 381-396) (Year: 1990).*

(Continued)

*Primary Examiner* — George Giroux
(74) *Attorney, Agent, or Firm* — Fujitsu Patent Center

(57) ABSTRACT

A calculation circuit calculates, among a plurality of neurons whose states are represented by variables each having m values (m is a positive integer of 3 or greater), two energy changes caused by a state change of a second neuron by $2^n$ (n is an integer of 0 or greater) in positive and negative directions, based on a state change direction of a first neuron whose state has been updated and a weighting coefficient indicating magnitude of an interaction between the first and second neurons. A state transition determination circuit determines, based on magnitude relationships among a thermal excitation energy and the two energy changes, whether to allow updates of the state of the second neuron that cause the two energy change, outputs the determination results, and limits updates by which the state of the second neuron exceeds an upper limit value or falls below a lower limit value.

7 Claims, 16 Drawing Sheets

(56) References Cited

OTHER PUBLICATIONS

Shim et al. (Ising computation based combinatorial optimization using spin-Hall effect (SHE) induced stochastic magnetization revesal, 2017, pp. 1-9) (Year: 2017).*

Yoshimura et al. (FPGA-based Annealing Processor for Ising Model, 2016, pp. 436-442) (Year: 2016).*

* cited by examiner

OPTIMIZATION APPARATUS AND OPTIMIZATION APPARATUS CONTROL METHOD

CROSS-REFERENCE TO RELATED APPLICATION

This application is based upon and claims the benefit of priority of the prior Japanese Patent Application No. 2018-161212, filed on Aug. 30, 2018, the entire contents of which are incorporated herein by reference.

FIELD

The embodiments discussed herein are related to an optimization apparatus and an optimization apparatus control method.

BACKGROUND

Formerly the use of an optimization apparatus (which may also be referred to as an Ising machine or a Boltzmann machine) using an Ising-type energy function was known as a method for calculating multivariable optimization problems at which Neumann type computers are poor. The optimization apparatus performs a calculation by replacing a problem to be calculated with an Ising model indicative of the behavior of the spin of a magnetic material.

For example, the optimization apparatus also performs modeling of a problem by the use of a neural network. In that case, each of a plurality of bits corresponding to a plurality of spins included in the Ising model functions as a neuron which outputs "0" or "1" according to the value of another bit and a weighting value (which is also referred to as a coupling coefficient) indicative of the magnitude of the interaction between another bit and each bit itself. The optimization apparatus finds, by a stochastic search method such as simulated annealing, as a solution a combination of the state of each neuron by which the minimum value of a value of the energy function of the Ising model (hereinafter referred to as an energy) is obtained.

Formerly the following optimization apparatus was known. A combination of the state of each neuron which minimizes an energy is calculated by performing simulated annealing by the use of digital circuits.

See, for example, the following documents:
Japanese Laid-open Patent Publication No. 2018-041351;
Japanese Laid-open Patent Publication No. 2016-051314; and
Japanese Laid-open Patent Publication No. 2006-072691.

By the way, there are many optimization problems including an integer programming problem in which a variable has three or more values and not two values, that is to say, 0 and 1.

However, if the state of a neuron is represented by conventional optimization apparatus by the use of variables having three or more values, one variable is represented by the use of a plurality of bits. This increases the scale of circuits used for calculating a change in energy of the Ising model on the basis of which whether to update the state of a neuron is determined.

SUMMARY

According to an aspect, there is provided an optimization apparatus including a plurality of Ising units each including: a calculation circuit configured to calculate, among a plurality of neurons which correspond to a plurality of spins included in an Ising model obtained by converting a problem to be calculated and whose states are represented by using variables each having m values (m is a positive integer greater than or equal to 3), two changes in energy of the Ising model caused by a change in a state of a second neuron by $2^n$ (n is an integer greater than or equal to 0) in both of positive and negative directions, based on a state change direction of a first neuron whose state has been updated and a weighting coefficient indicative of a magnitude of an interaction between the first neuron and the second neuron; and a state transition determination circuit configured to determine, based on magnitude relationships among a thermal excitation energy determined based on a random number and a temperature parameter and the two changes in energy, whether to allow updates of the state of the second neuron that cause the two changes in energy, to output determination results obtained by determining whether to allow the updates, and to limit an update by which the state of the second neuron exceeds an upper limit value or falls below a lower limit value, wherein the plurality of Ising units each output the determination results regarding different second neurons; an update neuron selection circuit configured to select, based on the determination results outputted by each of the plurality of Ising units, one second neuron whose update is allowed and to select the state change direction; and a state update circuit configured to update the state of the one second neuron selected by the update neuron selection circuit, based on the state change direction.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will now be described with reference to the accompanying drawings.

There are combinations of states of a plurality of neurons corresponding to a plurality of spins included in an Ising model obtained by converting a problem to be calculated. The following optimization apparatus search for a combination of states of the plurality of neurons, of the combinations of states of the plurality of neurons, which minimizes an energy function. The state of each neuron is represented by the use of a variable having m values (m is an integer greater than or equal to 3). Furthermore, it is assumed that the variable has a determined bit width and that the variable changes in a positive or negative direction by $2^n$ (n is an integer greater than or equal to 0).

For example, the Ising-type energy function $E(x)$ is defined as $$E(x) = -\sum_{\langle i,j \rangle} W_{ij} x_i x_j - \sum_i b_i x_i \quad (1)$$

The first term of the right side means that the products of states and a coupling coefficient of two neurons are added up without omission or duplication for all possible combinations of two neurons selected from among all neurons. $x_i$ is a variable (which is also referred to as a state variable) indicative of a state of an ith neuron. $x_j$ is a variable indicative of a state of a jth neuron. $W_{ij}$ is a weighting coefficient indicative of the magnitude of an interaction between the ith neuron and the jth neuron. $W_{ii}=0$. In many cases, $W_{ij}=W_{ji}$ (that is to say, in many cases, a weighting coefficient matrix is a symmetric matrix). Furthermore, the weighting coefficient $W_{ij}$ has a determined bit width (16 bits, 32 bits, 64 bits, or 128 bits, for example).

The second term of the right side means that the product of a bias coefficient and a variable indicative of a state of each of all the neurons is added up. $b_i$ is a bias coefficient of the ith neuron.

In addition, if the variable $x_i$ has m values and does not reach the upper limit or the lower limit, a change portion $\Delta x_i$ of the variable $x_i$ is $\pm 2^n$.

An energy change $\Delta E_{i\pm}$ caused by changes in the variable $x_i$ in the positive and negative directions is given by $$\Delta E_{i\pm} = E(x)\big|_{x_i \to x_i \pm 2^n} - E(x) = \mp 2^n \left( \sum_j W_{ij} x_j + b_i \right) = \mp 2^n h_i \quad (2)$$

As given by expression (2), the energy change $\Delta E_{i\pm}$ has two values according to (positive and negative) state change directions of the ith neuron.

In expression (2), $h_i$ is referred to as a local field.

First Embodiment

Figure 1:
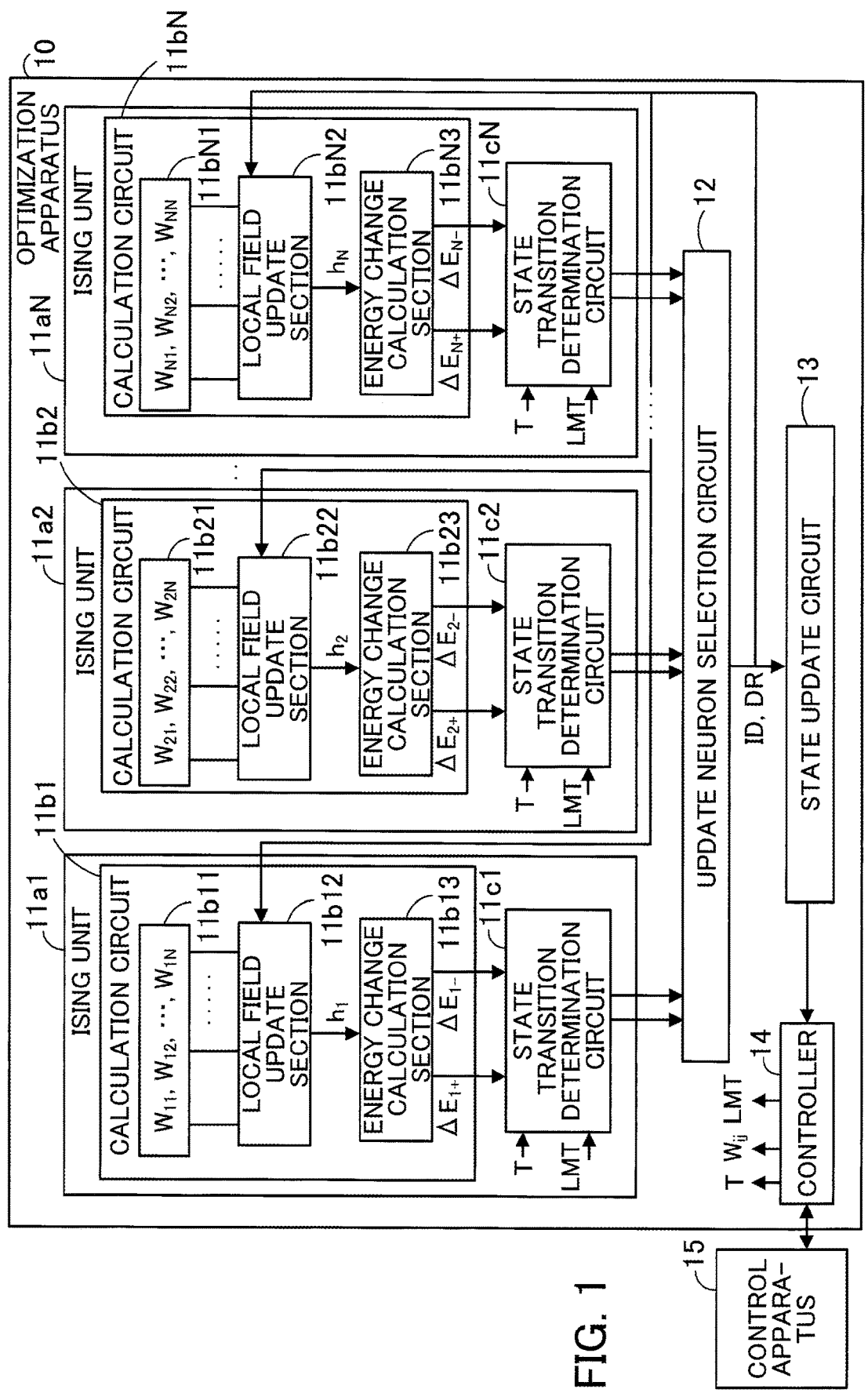
FIG. 1 illustrates an example of an optimization apparatus according to a first embodiment.

FIG. 1 illustrates an example of an optimization apparatus according to a first embodiment.

An optimization apparatus 10 according to a first embodiment includes N Ising units 11a1, 11a2, . . . , and 11aN which perform calculations regarding N neurons, an update neuron selection circuit 12, a state update circuit 13, and a controller 14. Each of the Ising units 11a1 through 11aN may be one-chip semiconductor integrated circuit. Alternatively, the Ising units 11a1 through 11aN may be included in a one-chip semiconductor integrated circuit.

The Ising unit 11a1 performs calculations regarding a first neuron (neuron whose identification information ID is 1) of the N neurons. The Ising unit 11a1 includes a calculation circuit 11b1 and a state transition determination circuit 11c1.

The calculation circuit 11b1 receives from the update neuron selection circuit 12 a state change direction DR of a neuron, of the N neurons, whose state is updated and identification information ID of the neuron. Furthermore, the calculation circuit 11b1 calculates energy changes $\Delta E_{1+}$ and $\Delta E_{1-}$ on the basis of a weighting coefficient indicative of the magnitude of an interaction between the neuron identified by the identification information ID and the first neuron and the state change direction DR. The state of the first neuron changes by $2^n$ in the positive and negative directions. The energy changes $\Delta E_{1+}$ and $\Delta E_1$ are two energy changes of the Ising model caused by these changes in the state of the first neuron.

In the example of FIG. 1, the calculation circuit 11b1 includes a register 11b11, a local field update section 11b12, and an energy change calculation section 11b13.

The register 11b11 stores N weighting coefficients $W_{11}$, $W_{12}$, . . . , and $W_{1N}$. The weighting coefficients $W_{11}$, $W_{12}$, . . . , and $W_{1N}$ may be stored in a memory such as static random access memory (SRAM). All weighting coefficients $W_{11}$ through $W_{NN}$ may be stored in one memory.

On the basis of the identification information ID of the neuron whose state is updated, the local field update section 11b12 selects a weighting coefficient indicative of the magnitude of an interaction between the neuron and the first neuron. Furthermore, the local field update section 11b12 updates a local field $h_1$ on the basis of the selected weighting coefficient and the state change direction DR of the neuron whose state is updated. An initial value of the local field $h_1$ is, for example, a bias coefficient $b_1$.

When the state of a neuron (jth neuron) changes by $2^n$ in the positive direction, a change portion of the local field $h_1$ is expressed as $+2^n W_{1j}$. When the state of the neuron (jth neuron) changes by $2^n$ in the negative direction, a change portion of the local field $h_1$ is expressed as $-2^n W_{1j}$.

Therefore, the local field update section 11b12 updates the local field $h_1$ by adding to or subtracting from the current local field $h_1$ according to the state change direction DR a value obtained by left-shifting the weighting coefficient $W_{ij}$ by n bits. This local field update section 11b12 is realized by the use of, for example, a selector, an adder (or a subtractor), and a shift operation circuit. If n=0, then the shift operation circuit is not needed.

The energy change calculation section 11b13 calculates the energy changes $\Delta E_{1+}$ and $\Delta E_{1-}$ on the basis of expression (2). The energy change calculation section 11b13 is realized by the use of, for example, a shift operation circuit and a sign inversion circuit. If n=0, then the shift operation circuit is not needed.

On the basis of the magnitude relationships among a thermal excitation energy and the energy changes $\Delta E_{1+}$ and $\Delta E_{1-}$, the state transition determination circuit 11c1 determines whether to allow updates of the state of the first neuron that cause the energy changes $\Delta E_{1+}$ and $\Delta E_{1-}$. Furthermore, the state transition determination circuit 11c1 outputs determination results obtained by determining whether to allow the updates. In addition, the state transition determination circuit 11c1 limits an update by which the state of the first neuron exceeds an upper limit value or falls below a lower limit value. That is to say, the state transition determination circuit 11c1 prevents an update by which the state of the first neuron goes beyond a domain. For example, a domain of a variable indicative of the state of each neuron is determined according to the type of a problem and restrictions on the hardware of the optimization apparatus 10.

For example, the thermal excitation energy is determined on the basis of a random number generated by a random number generation circuit described later and a temperature parameter T inputted from the controller 14.

Furthermore, limit information LMT including the upper limit value and the lower limit value is supplied from the controller 14. If the state of the first neuron changes by $2^n$ in the positive or negative direction and exceeds the upper limit value or falls below the lower limit value, then the state transition determination circuit 11c1 changes the energy change $\Delta E_{1+}$ or the energy change $\Delta E_1$ to, for example, a sufficiently large determined positive value so that an update of the state of the first neuron will not be allowed. For example, this determined positive value may be determined on the basis of a value indicative of a result obtained by determining, at the time of the energy change being changed to the determined positive value, whether to allow an update of the state of the first neuron.

Furthermore, If the state of the first neuron changes by $2^n$ in the positive or negative direction and exceeds the upper limit value or falls below the lower limit value, then the state transition determination circuit 11c1 may change a result obtained by determining whether to allow an update of the state of the first neuron to a value which is indicative that the update is not allowed.

An example of the above state transition determination circuit 11c1 will be described in second and later embodiments.

The other Ising units 11a2 through 11aN perform processes regarding second through Nth neurons respectively. This is the same with the Ising unit 11a1.

For example, a calculation circuit 11b2 of the Ising unit 11a2 includes a register 11b21, a local field update section 11b22, and an energy change calculation section 11b23. The register 11b21 stores N weighting coefficients $W_{21}$, $W_{22}$, ..., and $W_{2N}$. On the basis of identification information ID of a neuron whose state is updated, the local field update section 11b22 selects a weighting coefficient indicative of the magnitude of an interaction between the neuron and the second neuron. Furthermore, the local field update section 11b22 updates a local field $h_2$ on the basis of the selected weighting coefficient and a state change direction DR of the neuron whose state is updated. The energy change calculation section 11b23 calculates energy changes $\Delta E_{2+}$ and $\Delta E_{2-}$ on the basis of expression (2). Furthermore, on the basis of the magnitude relationships among a thermal excitation energy and the energy changes $\Delta E_{2+}$ and $\Delta E_{2-}$, a state transition determination circuit 11c2 of the Ising unit 11a2 determines whether to allow updates of the state of the second neuron that cause the energy changes $\Delta E_{2+}$ and $\Delta E_{2-}$.

In addition, the state transition determination circuit 11c2 outputs determination results obtained by determining whether to allow the updates. Moreover, the state transition determination circuit 11c2 limits an update by which the state of the second neuron exceeds an upper limit value or falls below a lower limit value.

A calculation circuit 11bN of the Ising unit 11aN includes a register 11bN1, a local field update section 11bN2, and an energy change calculation section 11bN3. The register 11bN1 stores N weighting coefficients $W_{N1}$, $W_{N2}$, ..., and $W_{NN}$. On the basis of identification information ID of a neuron whose state is updated, the local field update section 11bN2 selects a weighting coefficient indicative of the magnitude of an interaction between the neuron and the Nth neuron. Furthermore, the local field update section 11bN2 updates a local field $h_N$ on the basis of the selected weighting coefficient and a state change direction DR of the neuron whose state is updated. The energy change calculation section 11bN3 calculates energy changes $\Delta E_{N+}$ and $\Delta E_{N-}$ on the basis of expression (2). Furthermore, on the basis of the magnitude relationships among a thermal excitation energy and the energy changes $\Delta E_{N+}$ and $\Delta E_{N-}$, a state transition determination circuit 11cN of the Ising unit 11aN determines whether to allow updates of the state of the Nth neuron that cause the energy changes $\Delta E_{N+}$ and $\Delta E_{N-}$. In addition, the state transition determination circuit 11cN outputs determination results obtained by determining whether to allow the updates. Moreover, the state transition determination circuit 11cN limits an update by which the state of the Nth neuron exceeds an upper limit value or falls below a lower limit value.

On the basis of determination results outputted by the Ising units 11a1 through 11aN, the update neuron selection circuit 12 selects one neuron whose state is allowed to be updated and selects a state change direction DR. The update neuron selection circuit 12 outputs identification information ID of the selected neuron whose state is allowed to be updated and the state change direction DR.

On the basis of the state change direction DR, the state update circuit 13 changes (updates) the state of the neuron selected by the update neuron selection circuit 12 by $2^n$ in the positive or negative direction. The state update circuit 13 has a storage section (such as a register) and holds states of the N neurons.

The controller 14 transmits information to and receives information from a control apparatus 15 such as a personal computer (PC). For example, the controller 14 receives from the control apparatus 15 weighting coefficients $W_{ij}$ which represent the Ising model and sets the weighting coefficients $W_{ij}$ in the Ising units 11a1 through 11aN (stores the weighting coefficients $W_{ij}$ in the registers 11b11 through 11bN1). In addition, the controller 14 may receive from the control apparatus 15 initial values of local fields $h_i$ (bias coefficients $b_i$, for example) and set them in the Ising units 11a1 through 11aN.

Furthermore, the controller 14 receives annealing conditions (such as the maximum value and minimum value of the temperature parameter T and information regarding how to lower the value of the temperature parameter T) from the control apparatus 15 and sets the temperature parameter T in the Ising units 11a1 through 11aN on the basis of the annealing conditions. The controller 14 gradually lowers the value of the temperature parameter T on the basis of the annealing conditions. In addition, the controller 14 receives the above limit information LMT from the control apparatus 15 and sets the limit information LMT including the upper limit value and lower limit value of the state of each neuron in the Ising units 11a1 through 11aN. Moreover, the controller 14 transmits as a solution to the control apparatus 15 the state of each neuron held in the state update circuit 13, for example, at the time of lowering the value of the temperature parameter T determined times (or at the time of the temperature parameter T reaching the minimum value).

The controller 14 is realized by an application specific electronic circuit such as an application specific integrated circuit (ASIC) or a field programmable gate array (FPGA). The controller 14 may be a processor such as a central processing unit (CPU) or a digital signal processor (DSP). In that case, the processor executes a program stored in a memory (not illustrated). By doing so, the above processes by the controller 14 are performed. The functions of the controller 14 may be included in the control apparatus 15.

An example of the operation of the optimization apparatus 10 according to the first embodiment will now be described.

Figure 2:
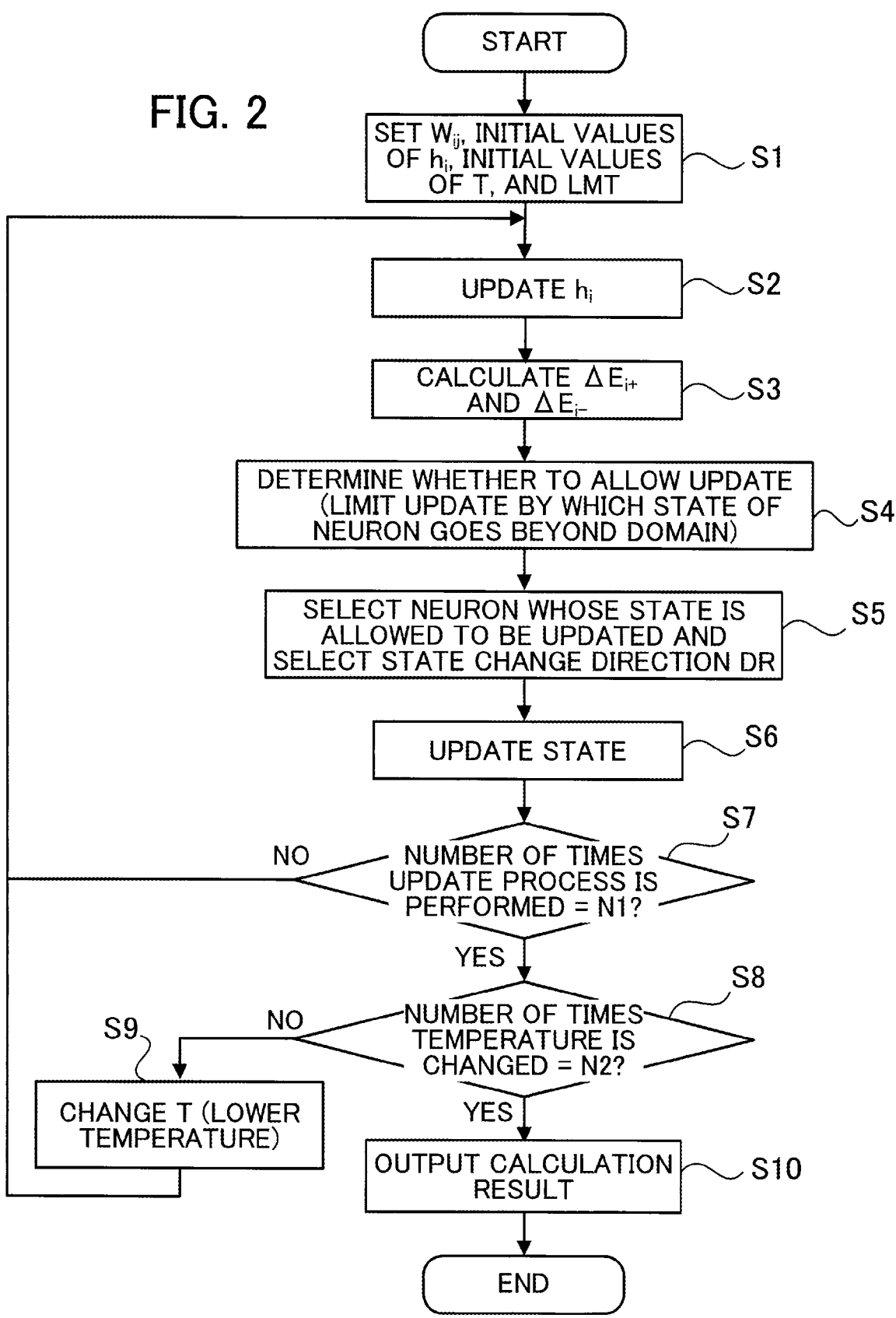
FIG. 2 is a flow chart illustrative of the flow of an example of the operation of the optimization apparatus according to the first embodiment.

FIG. 2 is a flow chart illustrative of the flow of an example of the operation of the optimization apparatus according to the first embodiment.

First the controller 14 sets in the Ising units 11a1 through 11aN weighting coefficients $W_{ij}$, initial values of local fields $h_i$, initial values of the temperature parameter T, and the limit information LMT received from the control apparatus 15 (step S1).

The local field update sections 11b12 through 11bN2 update the local fields $h_i$ in the second and later update processes by performing the above process (step S2).

Each of the energy change calculation section 11b13 through 11bN3 calculates two energy changes $\Delta E_{i+}$ and $\Delta E_{i-}$ on the basis of expression (2) (step S3).

Each of the state transition determination circuits 11c1 through 11cN performs the above process in order to determine whether to allow updates of the state of each neuron that cause the energy changes $\Delta E_{i+}$ and $\Delta E_{i-}$ (step S4). Furthermore, each of the state transition determination circuits 11c1 through 11cN performs the above process in step S4 in order to limit an update by which the state of each neuron goes beyond a domain.

On the basis of determination results outputted by the Ising units 11a1 through 11aN, the update neuron selection circuit 12 selects one neuron whose state is allowed to be updated and selects a state change direction DR (step S5).

The state update circuit 13 updates the state of the neuron selected by the update neuron selection circuit 12 on the basis of the state change direction DR (step S6).

The controller 14 determines whether or not the update process from step S2 to step S6 is repeated determined N1 times (step S7). If the update process from step S2 to step S6 is not repeated the determined N1 times, then the update process from step S2 to step S6 is repeated.

If the update process from step S2 to step S6 is repeated the determined N1 times, then the controller 14 determines whether or not the number of times the temperature parameter T is changed (number of times temperature is changed) has reached determined N2 times (step S8).

If the number of times temperature is changed has not reached the determined N2 times, then the controller 14 changes the temperature parameter T (lowers temperature) (step S9). The determined N1 times, the determined N2 times, and how to change the value of the temperature parameter T (how much the value of the temperature parameter T is decreased at a time, for example) are determined on the basis of annealing conditions. After step S9 is performed, the process is repeated from step S2.

If the number of times temperature is changed has reached the determined N2 times, then the controller 14 transmits (outputs) as a solution (calculation result) to the control apparatus 15 the state of each neuron held at that time in the state update circuit 13 (step S10).

With the above optimization apparatus 10 according to the first embodiment an allowed change in the state of each neuron having three or more values is set to $\pm 2^n$ (n is an integer greater than or equal to 0). By doing so, the structure of circuits used for calculating an energy change of the Ising model is simplified and an increase in circuit scale is suppressed. Furthermore, the state of a neuron having three or more values is treated on a small circuit scale. This widens the scope of problems that the optimization apparatus 10 is able to solve.

The values of n may differ among different neurons.

Second Embodiment

Figure 3:
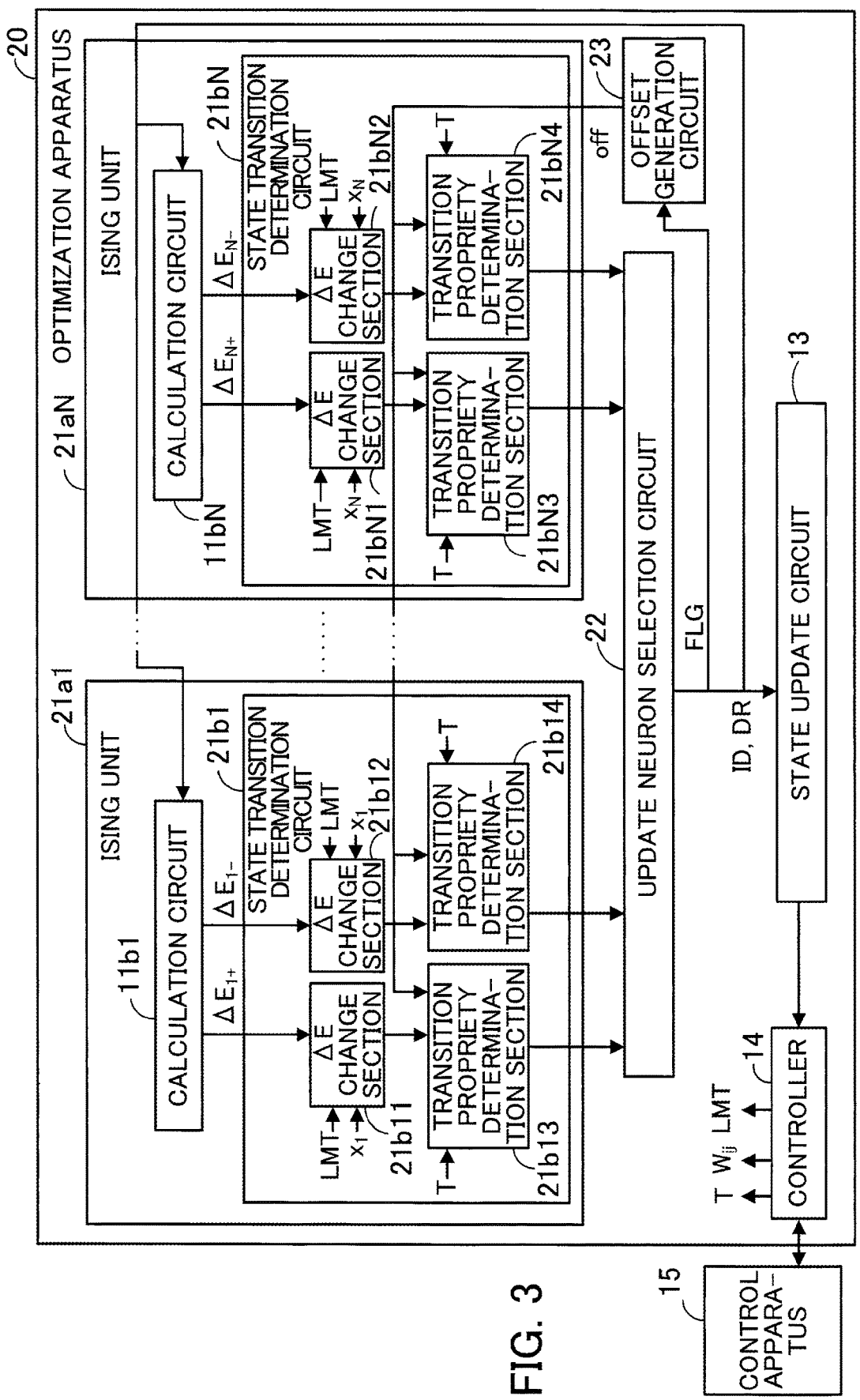
FIG. 3 illustrates an example of an optimization apparatus according to a second embodiment.

FIG. 3 illustrates an example of an optimization apparatus according to a second embodiment. Components in FIG. 3 which are the same as those of the optimization apparatus 10 according to the first embodiment illustrated in FIG. 1 are marked with the same numerals.

With an optimization apparatus 20 according to a second embodiment a state transition determination circuit 21b1 of an Ising unit 21a1 includes $\Delta E$ change sections 21b11 and 21b12 and transition propriety determination sections 21b13 and 21b14.

If a variable $x_1$ changes by $+2^n$ and exceeds an upper limit value, then the $\Delta E$ change section 21b11 changes an energy change $\Delta E_{1+}$ to a determined positive value $\Delta E_{max}$.

If the variable $x_1$ changes by $-2^n$ and falls below a lower limit value, then the $\Delta E$ change section 21b12 changes an energy change $\Delta E_{1-}$ to the determined positive value $\Delta E_{max}$.

A sufficiently large value is used as the positive value $\Delta E_{max}$ so that if the positive value $\Delta E_{max}$ is supplied to the transition propriety determination sections 21b13 and 21b14, the probability that update of the variable $x_1$ will be allowed will become approximately zero.

Figure 4:
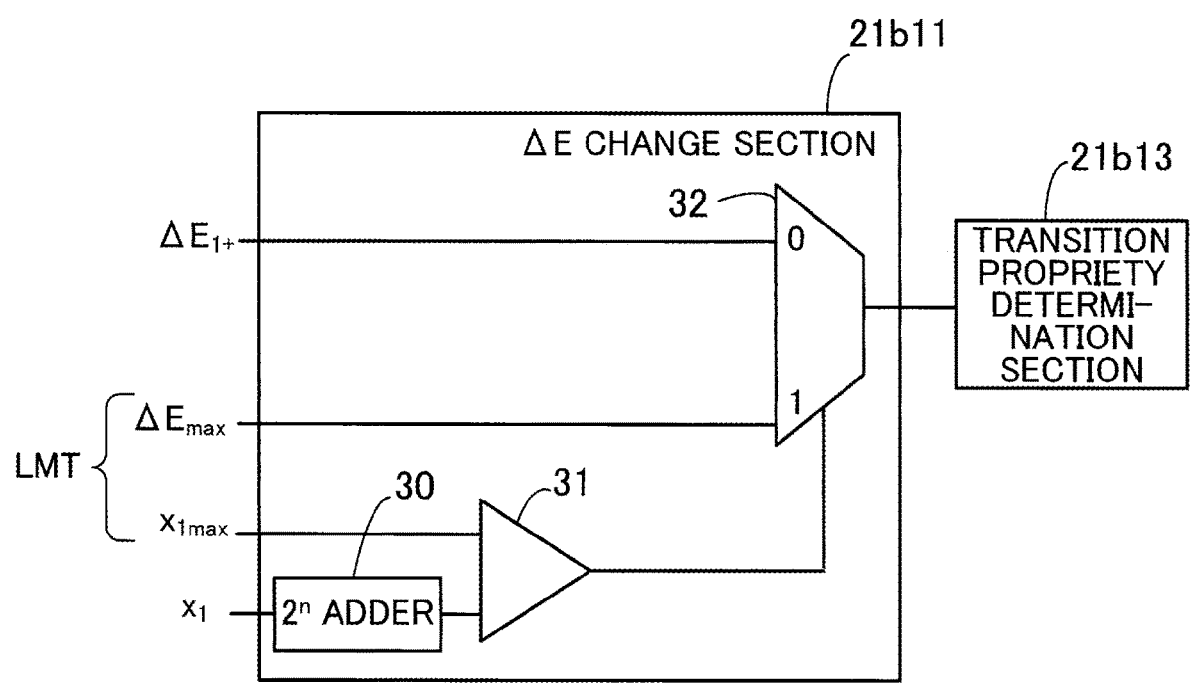
FIG. 4 illustrates an example of a first ΔE change section.

FIG. 4 illustrates an example of a first $\Delta E$ change section. FIG. 4 illustrates an example of the $\Delta E$ change section 21b11.

The $\Delta E$ change section 21b11 includes a $2^n$ adder 30, a comparator circuit 31, and a selector 32.

The $2^n$ adder 30 adds $2^n$ to the current variable $x_1$ supplied from a state update circuit 13.

The comparator circuit 31 compares an upper limit value $x_{1max}$ of the variable $x_1$ included in limit information LMT and an addition result obtained by the $2^n$ adder 30. Furthermore, if the addition result is greater than the upper limit value $x_{1max}$, then the comparator circuit 31 outputs 1. In the other cases, the comparator circuit 31 outputs 0.

The selector 32 inputs the energy change $\Delta E_{1+}$ and the positive value $\Delta E_{max}$ included in the limit information LMT. If an output of the comparator circuit 31 is 1, then the selector 32 outputs the positive value $\Delta E_{max}$. If an output of the comparator circuit 31 is 0, then the selector 32 outputs the energy change $\Delta E_{1+}$.

Figure 5:
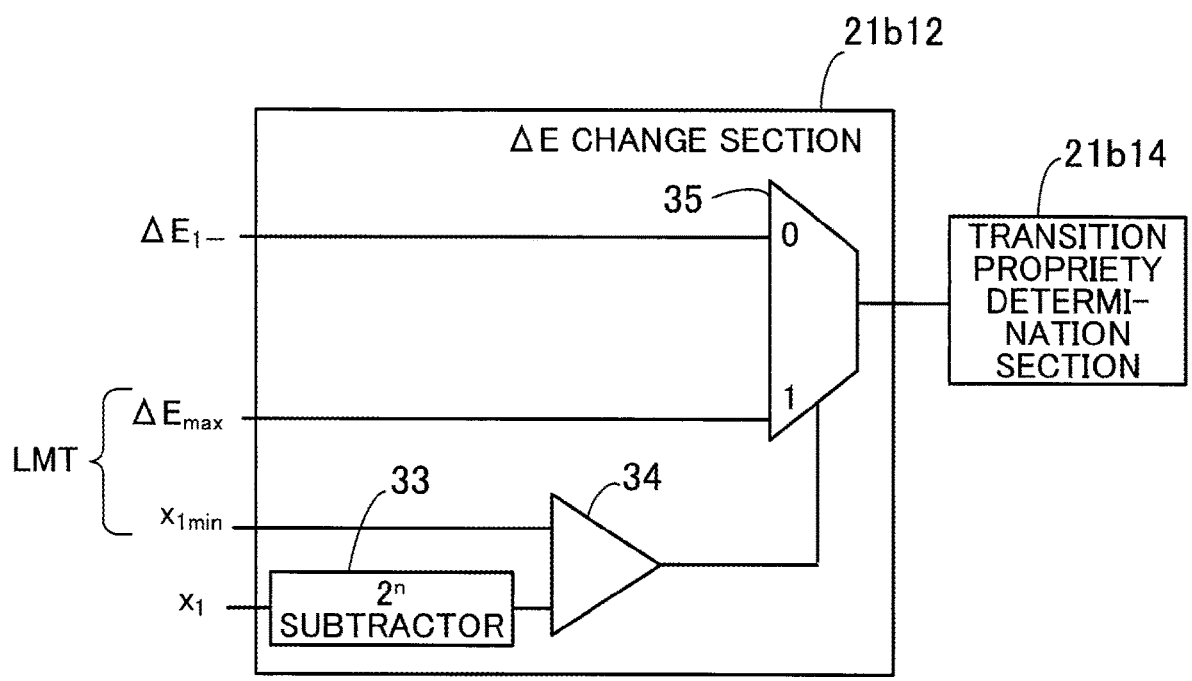
FIG. 5 illustrates an example of a second ΔE change section.

FIG. 5 illustrates an example of a second $\Delta E$ change section. FIG. 5 illustrates an example of the $\Delta E$ change section 21b12.

The $\Delta E$ change section 21b12 includes a $2^n$ subtractor 33, a comparator circuit 34, and a selector 35.

The $2^n$ subtractor 33 subtracts $2^n$ from the current variable $x_1$ supplied from the state update circuit 13.

The comparator circuit 34 compares a lower limit value $x_{1min}$ of the variable $x_1$ included in the limit information LMT and a subtraction result obtained by the $2^n$ subtractor 33. Furthermore, if the subtraction result is smaller than the lower limit value $x_{1min}$, then the comparator circuit 34 outputs 1. In the other cases, the comparator circuit 34 outputs 0.

The selector 35 inputs the energy change $\Delta E_{1=}$ and the determined positive value $\Delta E_{max}$ included in the limit information LMT. If an output of the comparator circuit 34 is 1, then the selector 35 outputs the positive value $\Delta E_{max}$. If an output of the comparator circuit 34 is 0, then the selector 35 outputs the energy change $\Delta E_1$.

On the basis of the magnitude relationship between the energy change $\Delta E_{1-}$ or the positive value $\Delta E_{max}$ and a thermal excitation energy, the transition propriety determination section 21b13 illustrated in FIG. 3 determines whether to allow update of the state of a first neuron that causes the energy change $\Delta E_{1+}$.

On the basis of the magnitude relationship between the energy change $\Delta E_{1-}$ or the positive value $\Delta E_{max}$ and the thermal excitation energy, the transition propriety determination section 21b14 determines whether to allow an update of the state of the first neuron that causes the energy change $\Delta E_{1-}$.

Figure 6:
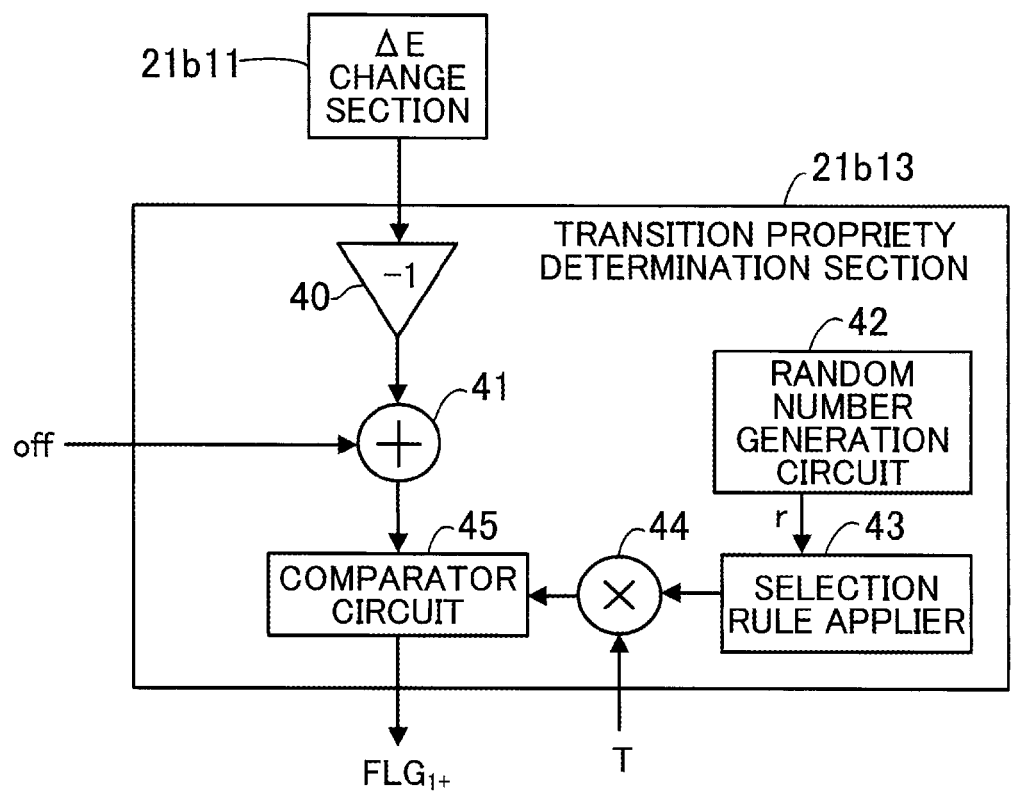
FIG. 6 illustrates an example of a transition propriety determination section.

FIG. 6 illustrates an example of a transition propriety determination section.

The transition propriety determination section 21b13 includes a sign inverter 40, an adder 41, a random number generation circuit 42, a selection rule applier 43, a multiplier 44 and a comparator circuit 45.

The sign inverter 40 multiplies the energy change $\Delta E_{1+}$ or the positive value $\Delta E_{max}$ outputted by the $\Delta E$ change section 21b11 by −1 to perform a sign inversion.

The adder 41 adds an offset value off generated by an offset generation circuit 23 described later to an output value of the sign inverter 40.

The random number generation circuit 42 generates a uniform random number r greater than or equal to 0 and smaller than or equal to 1.

The selection rule applier 43 outputs a value based on a selection rule (Metropolis method or the Gibbs method) adopted for performing simulated annealing.

If simulated annealing is performed, an allowance probability $A(\Delta E, T)$ of a state transition which causes an energy change $\Delta E$ is determined by the following expression (3). By doing so, it is proved that a state reaches an optimum solution at the limit at which time (number of repetition times) is infinite.

$$A(\Delta E, T) = f(-\Delta E/T) \qquad (3)$$

$$f(-\Delta E/T) = \begin{cases} \min[1, \exp(-\Delta E/T)] & \text{Metropolis method} \\ 1/[1 + \exp(\Delta E/T)] & \text{Gibbs method} \end{cases}$$

In expression (3), T indicates the above temperature parameter T.

It is assumed that an allowance probability $A(\Delta E, T)$ given by expression (3) is used and that a steady state is reached after a sufficient number of repetition times. Then an occupation probability of each state follows Boltzmann distribution in a thermal equilibrium state in the thermodynamics. When temperature is gradually lowered from a high value, an occupation probability of a low energy state increases. Therefore, when temperature is sufficiently lowered, a low energy state will be obtained. This is very similar to a change in state which occurs at the time of annealing a material. Accordingly, this method is referred to as simulated annealing. At this time a state transition by which energy increases occurs stochastically. This corresponds to thermal excitation in the physics.

A circuit for outputting flag information (=1) which is indicative that a state transition which causes the energy change $\Delta E$ is allowed with the allowance probability $A(\Delta E, T)$ is realized by a comparator which outputs a value based on a result obtained by comparing $f(-\Delta E/T)$ in expression (3) and the uniform random number r.

However, the same function is also realized by making the following change. Even if the same monotone increasing function is made to operate on two numbers, the magnitude relationship between them does not change. Therefore, even if the same monotone increasing function is made to operate on two inputs of a comparator, its output does not change. For example, $f^{-1}(-\Delta E/T)$ which is an inverse function of $f(-\Delta E/T)$ is used as a monotone increasing function made to operate on $f(-\Delta E/T)$ and $f^{-1}(r)$ which is obtained by substituting r for $-\Delta E/T$ of $f^{-1}(-\Delta E/T)$ is used as a monotone increasing function made to operate on the uniform random number r. In that case, a circuit which outputs 1 when $-\Delta E/T$ is greater than $f^{-1}(r)$ may be used as a circuit having the same function as the above comparator has. Furthermore, the temperature parameter T is positive. Therefore, a circuit which outputs 1 when $-\Delta E$ is greater than $T \cdot f^{-1}(r)$ may be used as a circuit having the same function as the above comparator has.

The selection rule applier 43 illustrated in FIG. 6 uses a conversion table for converting the uniform random number r inputted to a value of the above $f^{-1}(r)$. By doing so, the selection rule applier 43 outputs a value of $f^{-1}(r)$. If the Metropolis method is applied, then $f^{-1}(r)$ is $\log(r)$. For example, the conversion table is stored in a memory such as a random access memory (RAM) or a flash memory.

The multiplier 44 outputs the product $(T \cdot f^{-1}(r))$ of the temperature parameter T supplied from a controller 14 and $f^{-1}(r)$. $T \cdot f^{-1}(r)$ corresponds to a thermal excitation energy.

The comparator circuit 45 compares an addition result by the adder 41 and $T \cdot f^{-1}(r)$. If the addition result is greater than $T \cdot f^{-1}(r)$, then the comparator circuit 45 outputs 1 as flag information $FLG_{1+}$. If the addition result is smaller than $T \cdot f^{-1}(r)$, then the comparator circuit 45 outputs 0 as flag information $FLG_{1+}$.

The circuit structure of the transition propriety determination section 21b14 is the same as that of the transition propriety determination section 21b13.

Ising units 21a2 through 21aN have the same structure as the Ising unit 21a1 has and perform the same processes on second through Nth neurons respectively.

For example, a state transition determination circuit 21bN of the Ising unit 21aN includes $\Delta E$ change sections 21bN1 and 21bN2 and transition propriety determination sections 21bN3 and 21bN4.

If a variable $x_N$ changes by $+2^n$ and exceeds an upper limit value, then the $\Delta E$ change section 21bN1 changes an energy change $\Delta E_{N-}$ to the determined positive value $\Delta E_{max}$.

If the variable $x_N$ changes by $-2^n$ and falls below a lower limit value, then the $\Delta E$ change section 21bN2 changes an energy change $\Delta E_{N-}$ to the determined positive value $\Delta E_{max}$.

On the basis of the magnitude relationship between the energy change $\Delta E_{N-}$ or the positive value $\Delta E_{max}$ and a thermal excitation energy, the transition propriety determination section 21bN3 determines whether to allow update of the state of the Nth neuron that causes the energy change $\Delta E_{N-}$.

On the basis of the magnitude relationship between the energy change $\Delta E_{N-}$ or the positive value $\Delta E_{max}$ and the thermal excitation energy, the transition propriety determination section 21bN4 determines whether to allow update of the state of the Nth neuron that causes the energy change $\Delta E_{N-}$.

On the basis of determination results (flag information) outputted by the Ising units 21a1 through 21aN, an update neuron selection circuit 22 selects one neuron whose state is allowed to be updated and selects a state change direction DR. This is the same with the update neuron selection circuit 12 illustrated in FIG. 1. Furthermore, the update neuron selection circuit 22 outputs identification information ID of the selected neuron whose state is allowed to be updated and the state change direction DR. With the optimization apparatus 20 according to the second embodiment the update neuron selection circuit 22 also outputs flag information FLG regarding the selected neuron whose state is allowed to be updated.

The optimization apparatus 20 according to the second embodiment includes the offset generation circuit which generates an offset value off. When the flag information FLG supplied from the update neuron selection circuit 22 indicates that a state transition is not allowed (that is to say, when a state transition does not occur), the offset generation circuit 23 increments the offset value off. On the other hand, when the flag information FLG supplied from the update neuron selection circuit 22 indicates that a state transition is allowed (that is to say, when a state transition occurs), the offset generation circuit 23 resets the offset value off to 0. When the offset value off becomes larger, a state transition is more apt to be allowed. If the current state is a local solution, then an escape from the local solution is promoted.

An example of the operation of the optimization apparatus 20 according to the second embodiment will now be described.

Figure 7:
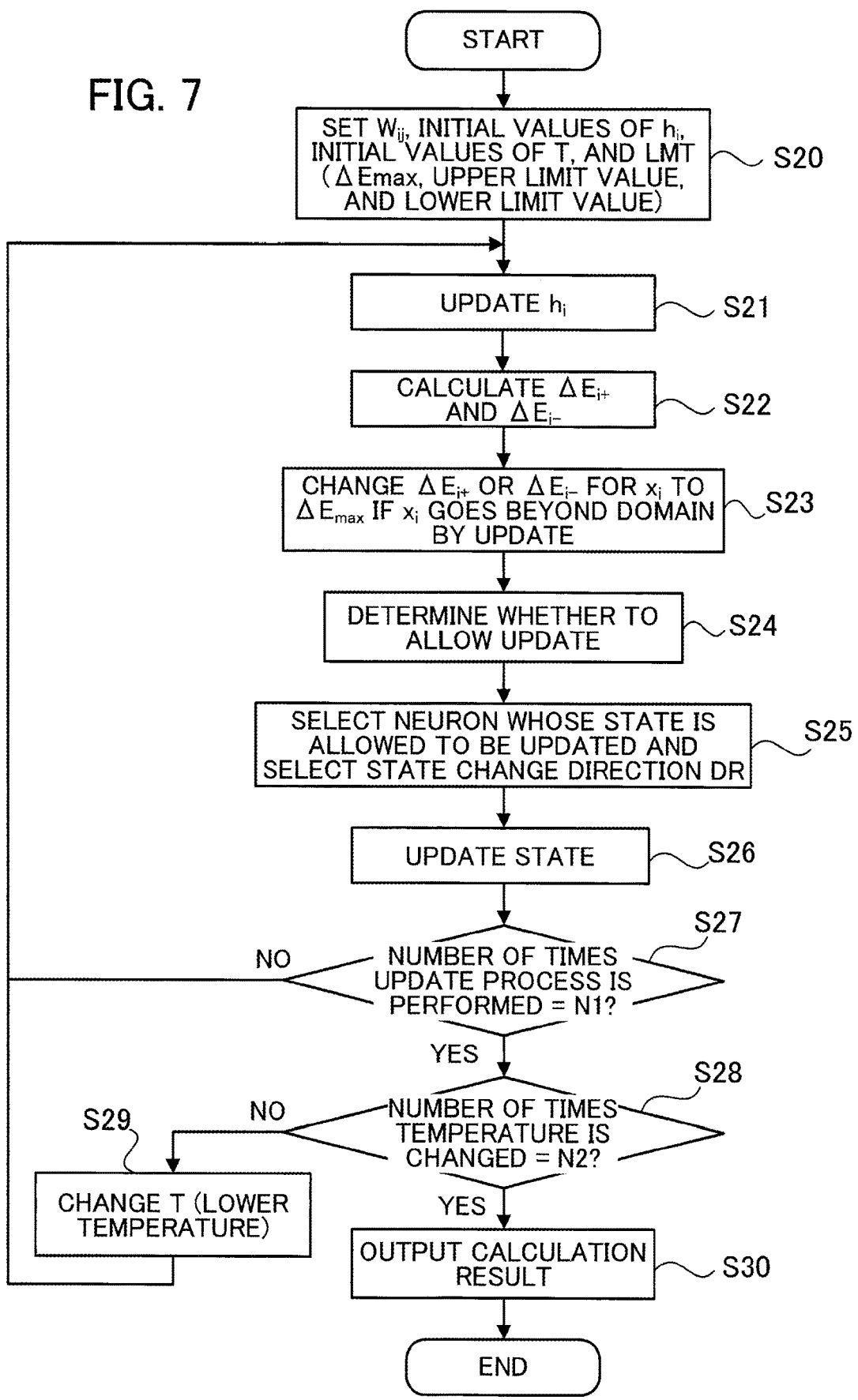
FIG. 7 is a flow chart illustrative of the flow of an example of the operation of the optimization apparatus according to the second embodiment.

FIG. 7 is a flow chart illustrative of the flow of an example of the operation of the optimization apparatus according to the second embodiment.

First the controller 14 sets in the Ising units 21a1 through 21aN weighting coefficients $W_{ij}$, initial values of local fields $h_i$, initial values of the temperature parameter T, and the limit information LMT received from a control apparatus 15 (step S20). With the optimization apparatus 20 according to the second embodiment the limit information LMT includes the positive value $\Delta E_{raax}$ and a domain (upper limit value and the lower limit value) of each variable $x_i$.

Steps S21 and S22 are the same as steps S2 and S3, respectively, illustrated in FIG. 2.

After step S22 is performed, each of the state transition determination circuits 21b1 through 21bN changes the energy change $\Delta E_{i+}$ or the energy change $\Delta E_{i-}$ for the variable $x_i$ to the positive value $\Delta E_{max}$ if the variable $x_i$ goes beyond the domain by an update (step S23).

Furthermore, each of the state transition determination circuits 21b1 through 21bN determines whether to allow updates of the state of each neuron that cause the energy changes $\Delta E_{i+}$ and $\Delta E_{i-}$ (step S24). For example, step S24 includes adding the above offset value off.

The subsequent steps S25 through S30 are the same as steps S5 through S10, respectively, illustrated in FIG. 2.

The same effect that is obtained by the optimization apparatus 10 according to the first embodiment is achieved by the above optimization apparatus 20 according to the second embodiment. Furthermore, with the optimization apparatus 20, the energy change $\Delta E_{i+}$ or the energy change $\Delta E_{i-}$ for the variable $x_i$ is changed to the positive value $\Delta E_{max}$ if the variable $x_i$ goes beyond the domain by the update. This suppresses an update by which the variable $x_i$ goes beyond the domain.

Third Embodiment

Figure 8:
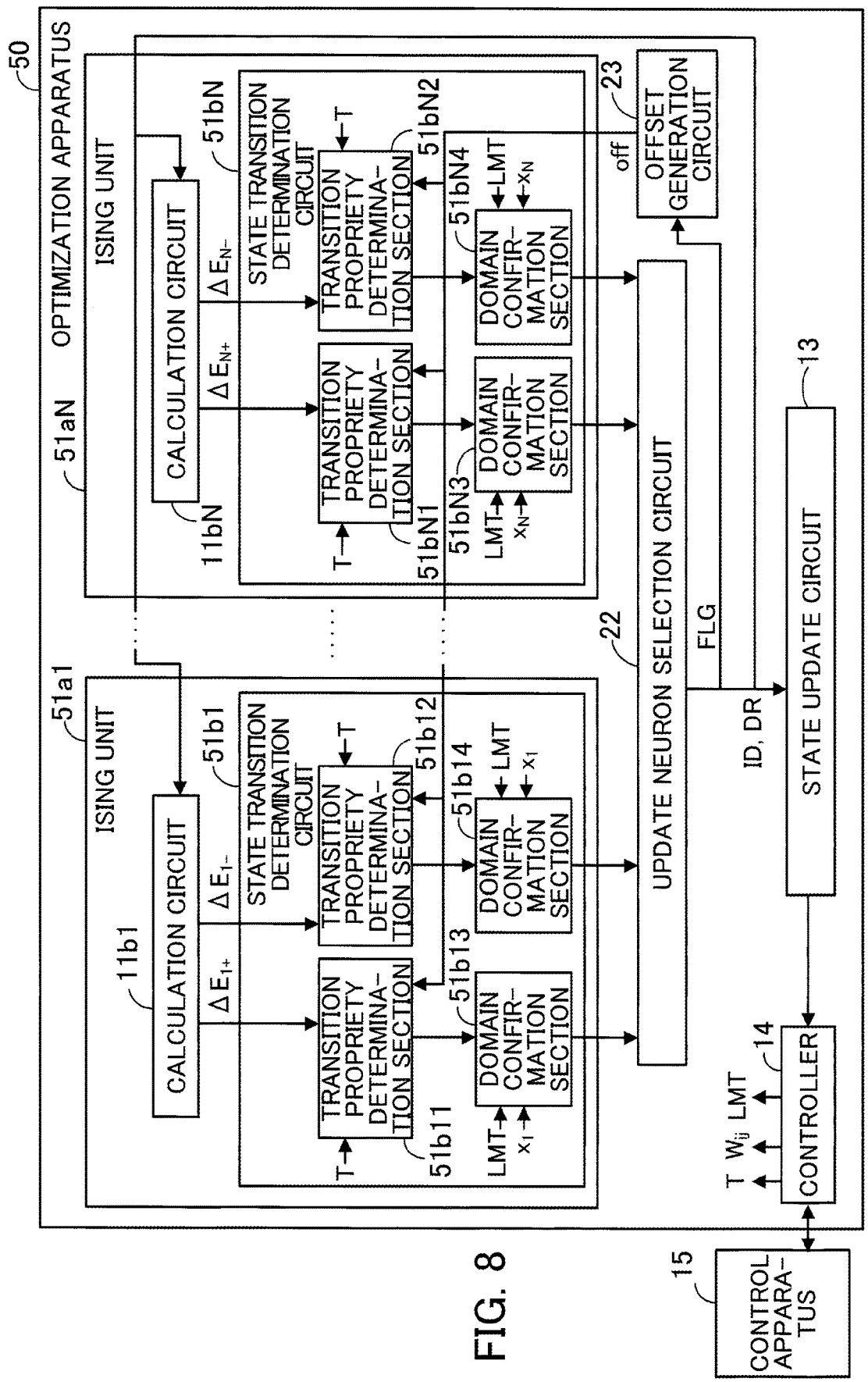
FIG. 8 illustrates an example of an optimization apparatus according to a third embodiment.

FIG. 8 illustrates an example of an optimization apparatus according to a third embodiment. Components in FIG. 8 which are the same as those of the optimization apparatus 10 or 20 illustrated in FIG. 1 or 3 are marked with the same numerals.

With an optimization apparatus 50 according to a third embodiment a state transition determination circuit 51b1 of an Ising unit 51a1 includes transition propriety determination sections 51b11 and 51b12 and domain confirmation sections 51b13 and 51b14.

On the basis of the magnitude relationship between an energy change $\Delta E_{1+}$ and a thermal excitation energy, the transition propriety determination section 51b11 determines whether to allow an update of the state of a first neuron that causes the energy change $\Delta E_{1+}$.

On the basis of the magnitude relationship between an energy change $\Delta E_{1-}$ and the thermal excitation energy, the transition propriety determination section 51b12 determines whether to allow an update of the state of the first neuron that causes the energy change $\Delta E_{1-}$.

The circuit structure of the transition propriety determination sections 51b11 and 51b12 is the same as that of the transition propriety determination section 21b13 illustrated in FIG. 6.

If a variable $x_1$ changes by $+2^n$ and exceeds an upper limit value, then the domain confirmation section 51b13 sets flag information indicative of a result obtained by determining whether to allow the update to 0 (which is indicative that the update is not allowed).

If the variable $x_1$ changes by $-2^n$ and falls below a lower limit value, then the domain confirmation section 51b14 sets flag information indicative of a result obtained by determining whether to allow the update to 0.

Figure 9:
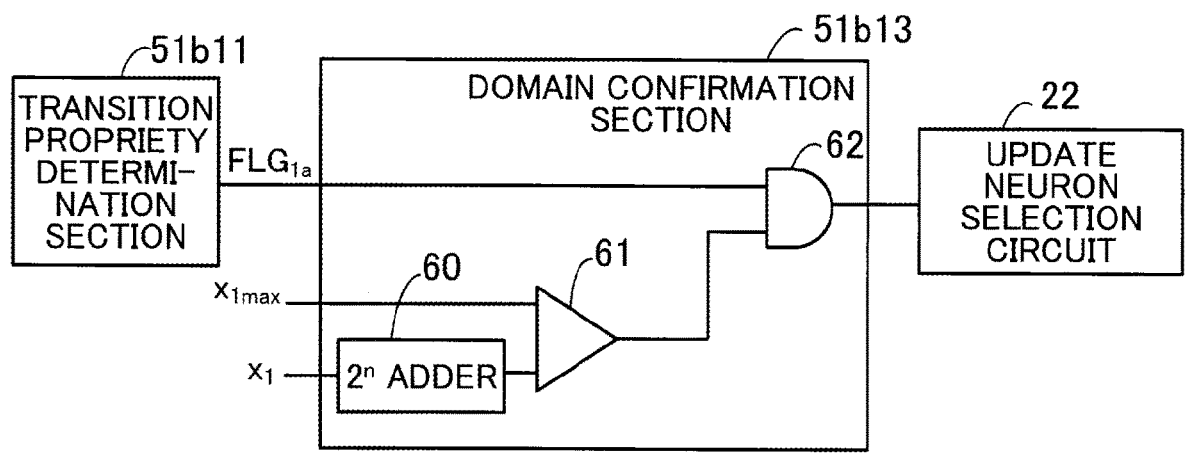
FIG. 9 illustrates an example of a first domain confirmation section.

FIG. 9 illustrates an example of a first domain confirmation section. FIG. 9 illustrates an example of the domain confirmation section 51b13.

The domain confirmation section 51b13 includes a $2^n$ adder 60, a comparator circuit 61, and an AND (logical product) circuit 62.

The $2^n$ adder 60 adds $2^n$ to the current variable $x_1$ supplied from a state update circuit 13.

The comparator circuit 61 compares an upper limit value $x_{1max}$ of the variable $x_1$ included in limit information LMT and an addition result obtained by the $2^n$ adder 60. Furthermore, if the addition result is greater than the upper limit value $x_{1max}$, then the comparator circuit 61 outputs 0. In the other cases, the comparator circuit 61 outputs 1.

Flag information $FLG_{1a}$ outputted by the transition propriety determination section 51b11 is inputted to one input terminal of the AND circuit 62 and an output of the comparator circuit 61 is inputted to the other input terminal of the AND circuit 62. Furthermore, if the output of the comparator circuit 61 is 1, then the AND circuit 62 outputs a value (0 or 1) of the flag information $FLG_{1a}$. If the output of the comparator circuit 61 is 0, then the AND circuit 62 outputs 0 regardless of the value of the flag information $FLG_{1a}$.

Figure 10:
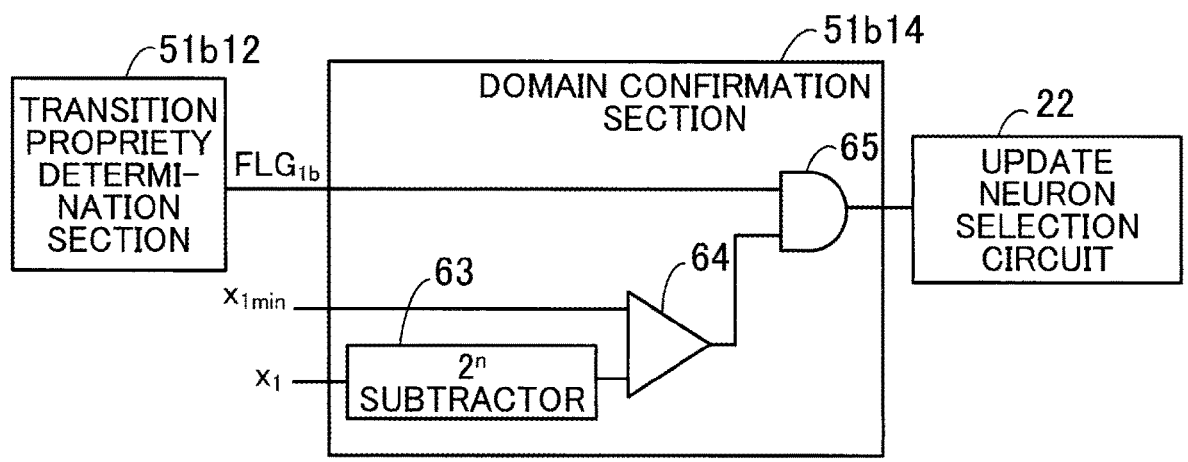
FIG. 10 illustrates an example of a second domain confirmation section.

FIG. 10 illustrates an example of a second domain confirmation section. FIG. 10 illustrates an example of the domain confirmation section 51b14.

The domain confirmation section 51*b*14 includes a $2^n$ subtractor 63, a comparator circuit 64, and an AND circuit 65.

The $2^n$ subtractor 63 subtracts $2^n$ from the current variable $x_1$ supplied from the state update circuit 13.

The comparator circuit 64 compares a lower limit value $x_{1min}$ of the variable $x_1$ included in the limit information LMT and a subtraction result obtained by the $2^n$ subtractor 63. Furthermore, if the subtraction result is smaller than the lower limit value $x_{1min}$, then the comparator circuit 64 outputs 0. In the other cases, the comparator circuit 64 outputs 1.

Flag information $FLG_{1b}$, outputted by the transition propriety determination section 51*b*12 is inputted to one input terminal of the AND circuit 65 and an output of the comparator circuit 64 is inputted to the other input terminal of the AND circuit 65. Furthermore, if the output of the comparator circuit 64 is 1, then the AND circuit 65 outputs a value (0 or 1) of the flag information $FLG_{1b}$. If the output of the comparator circuit 64 is 0, then the AND circuit 65 outputs 0 regardless of the value of the flag information $FLG_{1b}$.

Ising units 51*a*2 through 51*a*N have the same structure as the Ising unit 51*a*1 has and perform the same processes on second through Nth neurons respectively.

For example, a state transition determination circuit 51*b*N of the Ising unit 51*a*N includes transition propriety determination sections 51*b*N1 and 51*b*N2 and domain confirmation sections 51*b*N3 and 51*b*N4.

On the basis of the magnitude relationship between an energy change $\Delta E_{N+}$ and a thermal excitation energy, the transition propriety determination section 51*b*N1 determines whether to allow an update of the state of the Nth neuron that causes the energy change $\Delta E_{N+}$.

On the basis of the magnitude relationship between an energy change $\Delta E_{N-}$ and the thermal excitation energy, the transition propriety determination section 51*b*N2 determines whether to allow an update of the state of the Nth neuron that causes the energy change $\Delta E_{N-}$.

If a variable $x_N$ changes by $+2^n$ and exceeds an upper limit value, then the domain confirmation section 51*b*N3 sets flag information indicative of a result obtained by determining whether to allow the update to 0.

If the variable $x_N$ changes by $-2^n$ and falls below a lower limit value, then the domain confirmation section 51*b*N4 sets flag information indicative of a result obtained by determining whether to allow the update to 0.

An example of the operation of the optimization apparatus 50 according to the third embodiment will now be described.

Figure 11:
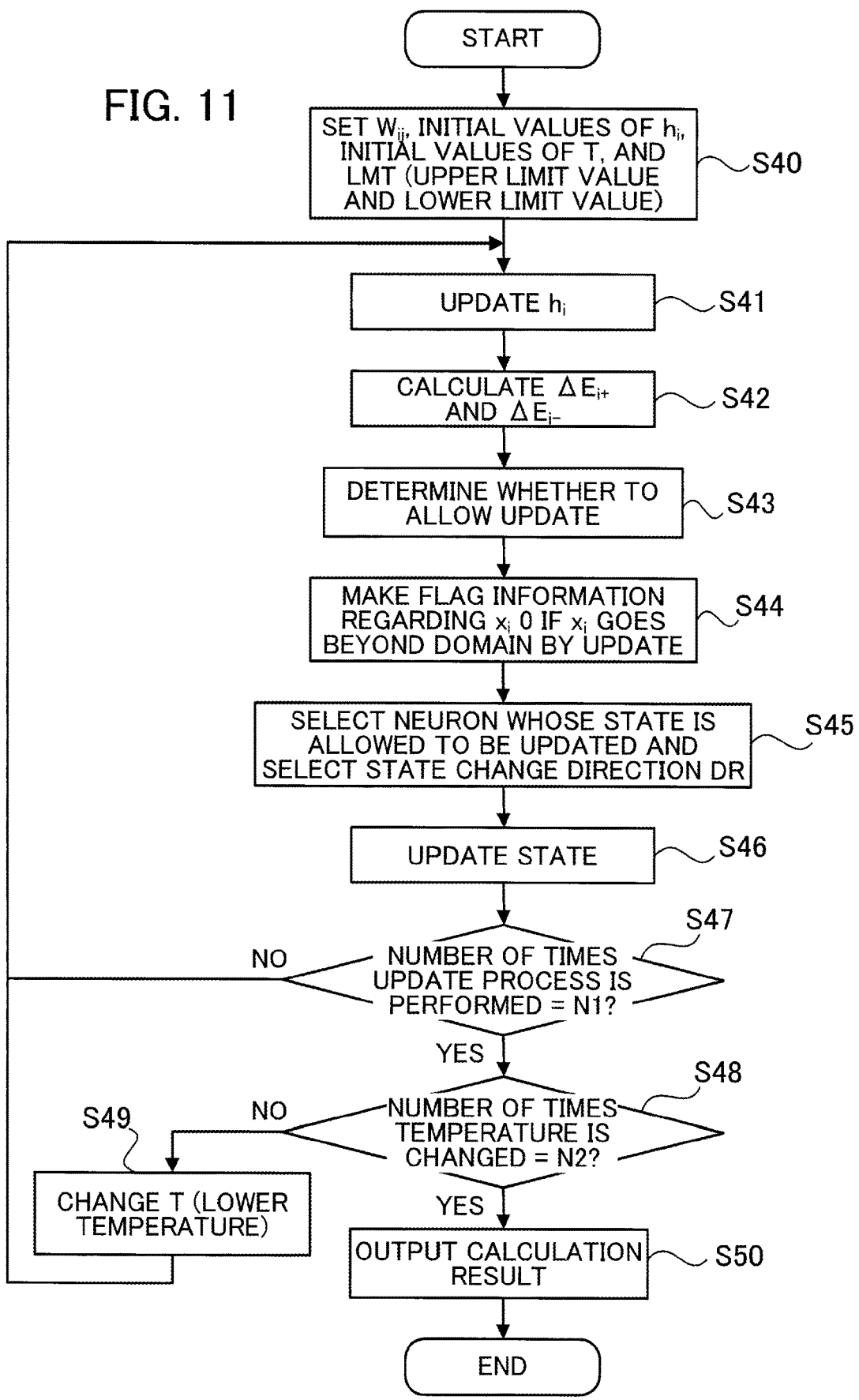
FIG. 11 is a flow chart illustrative of the flow of an example of the operation of the optimization apparatus according to the third embodiment.

FIG. 11 is a flow chart illustrative of the flow of an example of the operation of the optimization apparatus according to the third embodiment.

First a controller 14 sets in the Ising units 51*a*1 through 51*a*N weighting coefficients $W_{ij}$, initial values of local fields $h_i$, initial values of a temperature parameter T, and the limit information LMT received from a control apparatus 15 (step S40). With the optimization apparatus 50 according to the third embodiment the limit information LMT includes a domain (upper limit value and the lower limit value) of each variable $x_i$.

Steps S41 and S42 are the same as steps S2 and S3, respectively, illustrated in FIG. 2.

After step S42 is performed, each of the state transition determination circuits 51*b*1 through 51*b*N determines whether to allow updates of the state of each neuron that cause the energy changes $\Delta E_{i+}$ and $\Delta E_{i-}$ (step S43). For example, step S43 includes adding the above offset value off.

After that, each of the state transition determination circuits 51*b*1 through 51*b*N makes flag information regarding a variable $x_i$ 0 if the variable $x_i$ goes beyond the domain by an update (step S44).

The subsequent steps S45 through S50 are the same as steps S5 through S10, respectively, illustrated in FIG. 2.

The same effect that is obtained by the optimization apparatus 10 according to the first embodiment is achieved by the above optimization apparatus 50 according to the third embodiment. Furthermore, with the optimization apparatus 50, flag information regarding the variable $x_i$ is made 0 if the variable $x_i$ goes beyond the domain by an update. This reliably suppresses an update by which the variable $x_i$ goes beyond the domain.

Fourth Embodiment

Figure 12:
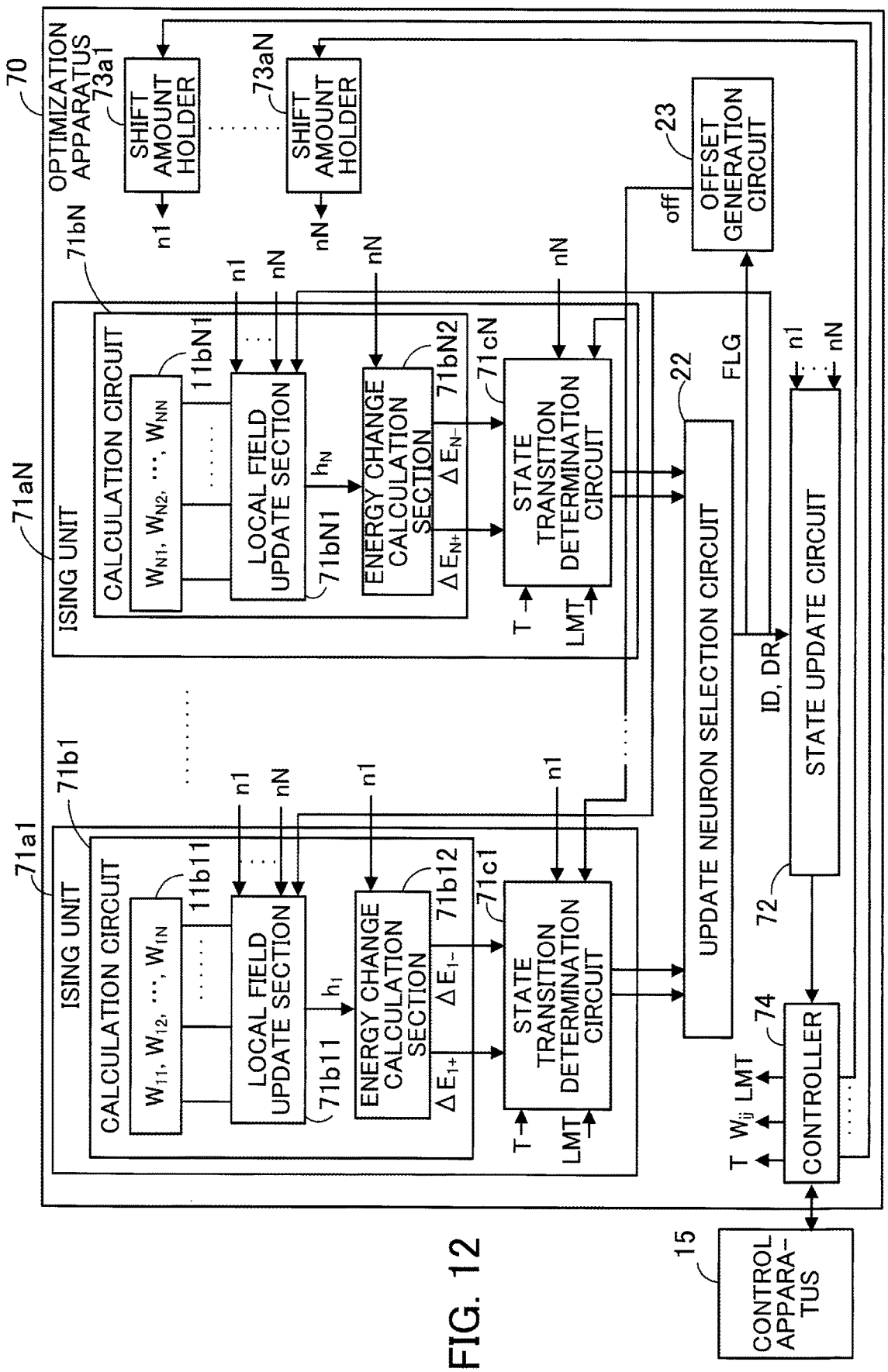
FIG. 12 illustrates an example of an optimization apparatus according to a fourth embodiment.

FIG. 12 illustrates an example of an optimization apparatus according to a fourth embodiment. Components in FIG. 12 which are the same as those of the optimization apparatus 10, 20, or 50 illustrated in FIG. 1, 3, or 8 are marked with the same numerals.

The optimization apparatus 70 according to the fourth embodiment includes shift amount holders 73*a*1 through 73*a*N which hold shift amounts n1 through nN to be supplied to calculation circuits 71*b*1 through 71*b*N, respectively, and a state update circuit 72. The shift amounts n1 through nN are values which determine the widths of changes in the states of N neurons, respectively, and are greater than or equal to 0. For example, the width of a change in the state of a first neuron is expressed as $\pm 2^{n1}$ and the width of a change in the state of an Nth neuron is expressed as $\pm 2^{nN}$. The shift amounts n1 through nN may be different from one another.

The shift amount holders 73*a*1 through 73*a*N are, for example, registers or SRAMs.

The shift amounts n1 through nN are supplied to local field update sections 71*b*11 through 71*b*N1 included in the calculation circuits 71*b*1 through 71*b*N of Ising units 71*a*1 through 71*a*N respectively. Furthermore, each of the local field update sections 71*b*11 through 71*b*N1 uses a shift amount for a neuron whose state is updated for updating a local field.

Figure 13:
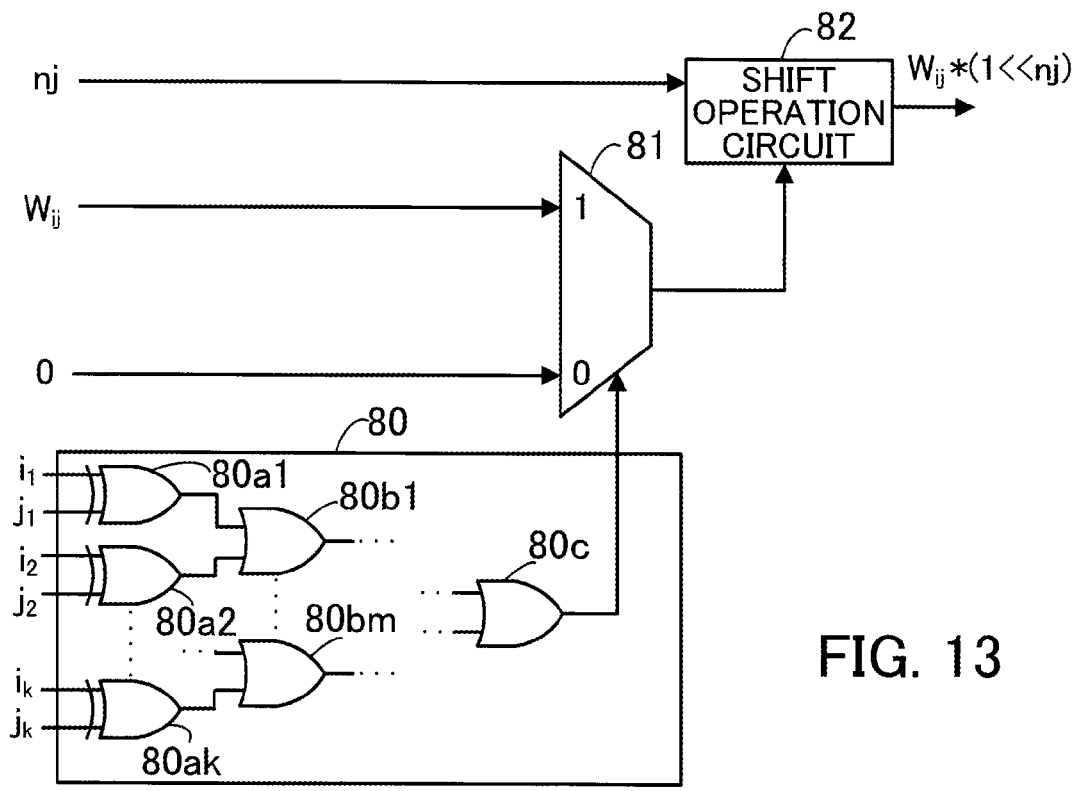
FIG. 13 illustrates an example of a portion of a local field update section in which a shift operation is performed.

FIG. 13 illustrates an example of a portion of a local field update section in which a shift operation is performed. FIG. 13 illustrates a portion of the local field update section 71*bi*1, of the local field update sections 71*b*11 through 71*b*N1, in which a local field for an ith neuron is updated.

The local field update section 71*bi*1 includes an anticoincidence circuit 80, a selection circuit 81, and a shift operation circuit 82.

If identification information ID (=i) of the ith neuron and identification information ID (=j) of a neuron whose state is updated do not match, then the anticoincidence circuit 80 outputs 1. If they match, then the anticoincidence circuit 80 outputs 0.

For example, the anticoincidence circuit 80 compares the identification information ID of the ith neuron and the identification information ID of the jth neuron bit by bit. If all bits of the identification information ID of the ith neuron and all bits of the identification information ID of the jth neuron match, then the anticoincidence circuit 80 outputs 0. In the other cases, the anticoincidence circuit 80 outputs 1.

FIG. 13 illustrates an example of the anticoincidence circuit 80. The anticoincidence circuit 80 includes k exclusive-OR (ExOR) circuits 80*a*1, 80*a*2, . . . , and 80*ak* and a plurality of logical sum (OR) circuits (OR circuits 80b1 through 80bm and 80c, for example).

The identification information ID of the ith neuron is made up of k bits and the identification information ID of the jth neuron is made up of k bits. Each of the ExOR circuits 80a1 through 80ak compares 1 bit of the identification information ID of the ith neuron and bit of the identification information ID of the jth neuron. If they match, then each of the ExOR circuits 80a1 through 80ak outputs 0. If they do not match, then each of the ExOR circuits 80a1 through 80ak outputs 1. For example, the ExOR circuit 80a1 compares the least significant bit ($i_1$) of the identification information ID of the ith neuron and the least significant bit ($j_1$) of the identification information ID of the jth neuron. If they match, then the ExOR circuit 80a1 outputs 0. If they do not match, then the ExOR circuit 80a1 outputs 1. The ExOR circuit 80ak compares the most significant bit ($i_k$) of the identification information ID of the ith neuron and the most significant bit ($j_k$) of the identification information ID of the jth neuron. If they match, then the ExOR circuit 80ak outputs 0. If they do not match, then the ExOR circuit 80ak outputs 1.

Each of the OR circuits 80b1 through 80bm receives two outputs among k outputs from the ExOR circuits 80a1 through 80ak and outputs the logical sum of the two outputs. For example, the OR circuit 80b1 receives the outputs of the ExOR circuits 80a1 and 80a2 and outputs the logical sum of them.

Outputs of the OR circuits 80b1 through 80bm are inputted by twos to a plurality of OR circuits (not illustrated) at the next stage. Furthermore, outputs of the plurality of OR circuits at that stage are inputted by twos to a plurality of OR circuits at the next stage. This process is repeated according to the value of k. In addition, an output of the OR circuit 80c at the last stage is an output of the anticoincidence circuit 80.

If the output of the anticoincidence circuit 80 is 1, then the selection circuit 81 selects and outputs a weighting coefficient $W_{ij}$. If the output of the anticoincidence circuit 80 is 0, then the selection circuit 81 selects and outputs 0.

If an output of the selection circuit 81 is 0, then the shift operation circuit 82 outputs 0. If an output of the selection circuit 81 is the weighting coefficient $W_{ij}$, then the shift operation circuit 82 outputs a value obtained by left-shifting the weighting coefficient $W_{ij}$ by nj bits ($W_{ij}*(1<<nj)=2^{nj}W_{ij}$). A change portion of a local field $h_i$ is obtained by multiplying $2^{nj}W_{ij}$ by 1 or −1 according to a state change direction DR.

In FIG. 12, one of the shift amounts n1 through nN is supplied to each of energy change calculation sections 71b12 through 71bN2 included in the calculation circuits 71b1 through 71bN of the Ising units 71a1 through 71aN respectively. For example, the energy change calculation section 71b12 receives the shift amount n1 and calculates $\Delta E_{1+}=-2^{n1}h_1$ and $\Delta E_{1-}=2^{n1}h_1$ on the basis of expression (2). The energy change calculation section 71bN2 receives the shift amount nN and calculates $\Delta E_{N+}=-2^{nN}h_N$ and $\Delta E_{N-}=2^{nN}h_N$ on the basis of expression (2).

State transition determination circuit 71c1 through 71cN are almost the same as the state transition determination circuits 21b1 through 21bN, respectively, included in the optimization apparatus 20 according to the second embodiment or the state transition determination circuits 51b1 through 51bN, respectively, included in the optimization apparatus 50 according to the third embodiment. As stated above, however, with the ΔE change sections 21b11 through 21bN1 and 21b12 through 21bN2 or the domain confirmation sections 51b13 through 51bN3 and 51b14 through 51bN4 $2^n$ is added to or subtracted from the state of the current neuron (see FIG. 4, 5, 9, or 10). Therefore, one of the shift amounts n1 through nN is supplied to each of the state transition determination circuit 71c1 through 71cN as a shift amount n.

The shift amounts n1 through nN are supplied to the state update circuit 72. The state update circuit 72 selects one shift amount corresponding to identification information ID outputted by an update neuron selection circuit 22. Furthermore, on the basis of the selected shift amount (hereinafter indicated by ns) and a state change direction DR, the state update circuit 72 changes the state of a neuron indicated by the identification information ID by $2^{ns}$ in the positive or negative direction.

A controller 74 has the same function as the controller 14 has and sets the shift amounts n1 through nN in the shift amount holders 73a1 through 73aN respectively. When the state of a neuron is updated, the controller 74 may change the shift amounts n1 through nN. By doing so, the speed of convergence to an optimum solution is controlled. For example, if the states of all neurons do not change even by performing an update process determined times (current state is a local solution), then the controller 74 increases the shift amounts n1 through nN. This increases the absolute value of an energy change and promotes an escape from the local solution. As a result, the speed of convergence is accelerated.

An example of the operation of the optimization apparatus 70 according to the fourth embodiment will now be described.

Figure 14:
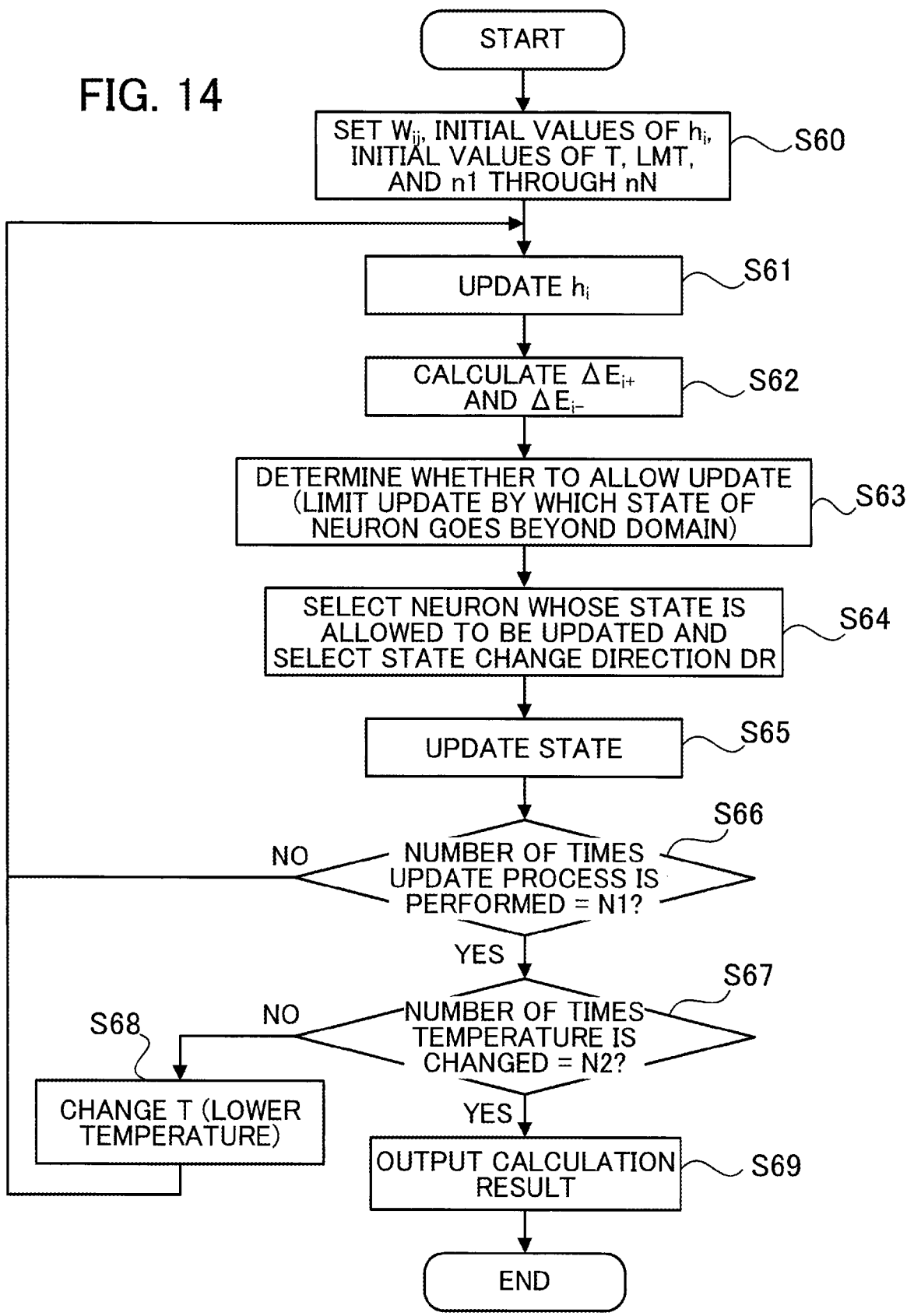
FIG. 14 is a flow chart illustrative of the flow of an example of the operation of the optimization apparatus according to the fourth embodiment.

FIG. 14 is a flow chart illustrative of the flow of an example of the operation of the optimization apparatus according to the fourth embodiment.

First the controller 74 sets in the Ising units 71a1 through 71aN weighting coefficients $W_{ij}$, initial values of local fields $h_i$, initial values of a temperature parameter T, and the limit information LMT received from a control apparatus 15. Furthermore, the controller 74 sets the shift amounts n1 through nN received from the control apparatus 15 in the shift amount holders 73a1 through 73aN respectively (step S60). The subsequent steps S61 through S69 are the same as steps S2 through S10, respectively, illustrated in FIG. 2. However, steps S61 through S69 differ from steps S2 through S10, respectively, only in that the shift amounts n1 through nN set are used. The controller 74 may change the magnitude of the shift amounts n1 through nN, for example, after step S68.

The same effect that is obtained by the optimization apparatus 10 according to the first embodiment is achieved by the above optimization apparatus 70 according to the fourth embodiment. Furthermore, with the optimization apparatus 70 the controller 74 individually sets the shift amounts n1 through nN for the N neurons. Therefore, the width of a change in the state of each neuron is variable. In addition, when the state of a neuron is updated, the controller 74 is able to change the shift amounts n1 through nN. As a result, the speed of convergence to an optimum solution is controlled.

By the way, for example, a processor included in a control apparatus, such as a PC, may execute a control program. By doing so, the function of the controller 14 included in the above optimization apparatus 10 according to the first embodiment, the above optimization apparatus according to the second embodiment, or the above optimization apparatus 50 according to the third embodiment or the function of the controller 74 included in the above optimization apparatus 70 according to the fourth embodiment is realized.

Figure 15:
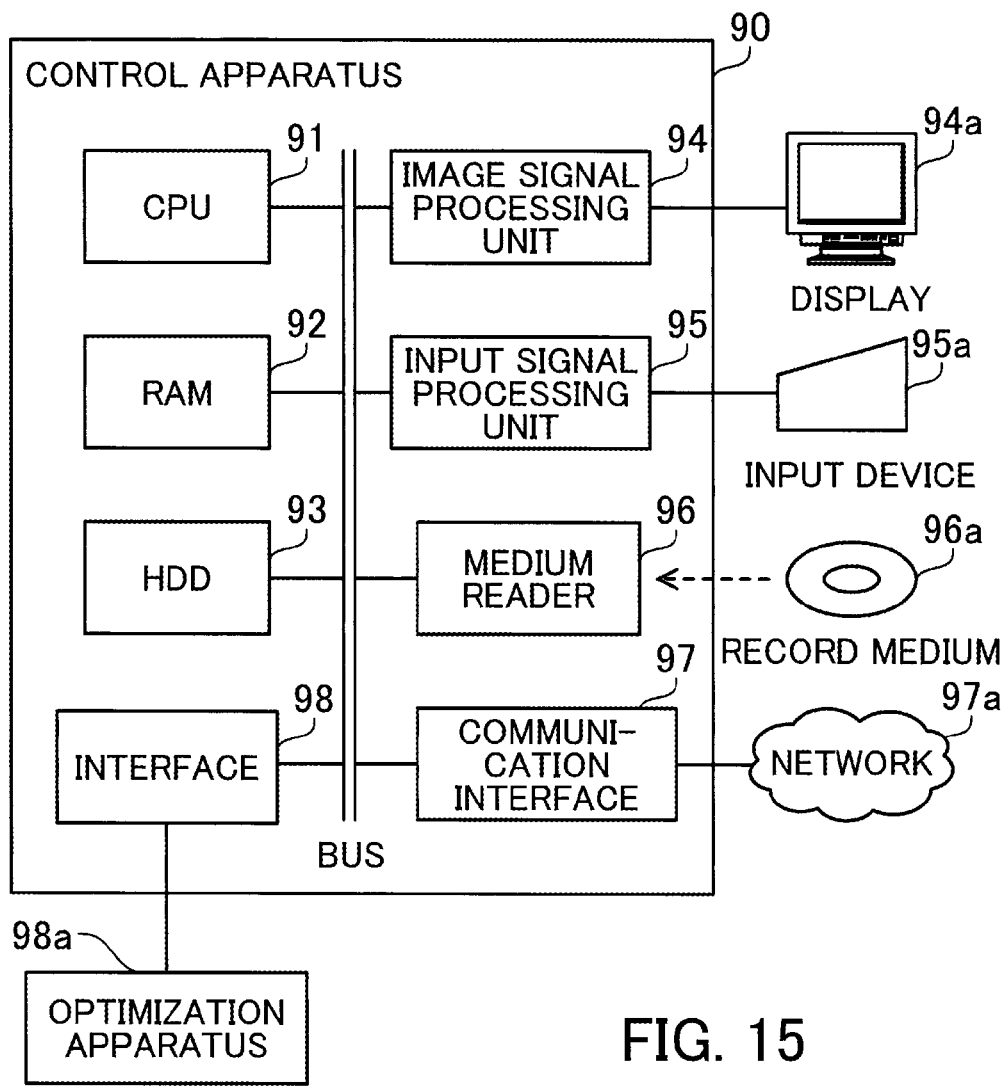
FIG. 15 illustrates an example of the hardware of a control apparatus.

FIG. 15 illustrates an example of the hardware of a control apparatus.

A control apparatus 90 includes a CPU 91, a RAM 92, a hard disk drive (HDD) 93, an image signal processing unit 94, an input signal processing unit 95, a medium reader 96, a communication interface 97, and an interface 98. These units are connected to a bus.

The CPU 91 is a processor including an operational circuit which executes an instruction of a program. The CPU 91 loads at least part of a program or data stored in the HDD 93 into the RAM 92 and executes it. The CPU 91 may include a plurality of processor cores. The control apparatus 90 may include a plurality of processors. Control of an optimization apparatus 98a may be exercised in parallel by the use of the plurality of processors or processor cores.

The RAM 92 is a volatile semiconductor memory which temporarily stores a program to be executed by the CPU 91 or data to be used by the CPU 91 for performing an operation. The control apparatus 90 may include a type of memory other than a RAM or include a plurality of memories.

The HDD 93 is a nonvolatile storage unit which stores programs for software, such as an operating system (OS), middleware, and application software, and data. For example, the programs include a control program which makes the control apparatus 90 perform the function of setting weighting coefficients, limit information LMT, and the like and controlling a temperature parameter T. The control apparatus 90 may include another type of storage unit, such as a flash memory or a solid state drive (SSD), and include a plurality of nonvolatile storage units.

The image signal processing unit 94 outputs an image (image indicative of the calculation result of an optimization problem, for example) to a display 94a connected to the control apparatus 90 in accordance with an instruction from the CPU 91. A cathode ray tube (CRT) display, a liquid crystal display (LCD), a plasma display panel (PDP), an organic electro-luminescence (OEL) display, or the like is used as the display 94a.

The input signal processing unit 95 acquires an input signal from an input device 95a connected to the control apparatus 90 and outputs it to the CPU 91. A pointing device such as a mouse, a touch panel, a touch pad, or a track ball, a keyboard, a remote controller, a button switch, or the like is used as the input device 95a. Two or more types of input devices may be connected to the control apparatus 90.

The medium reader 96 is a reader which reads a program or data recorded on a record medium 96a. A magnetic disk, an optical disk, a magneto-optical disk (MO), a semiconductor memory, or the like is used as the record medium 96a. The magnetic disk may be a flexible disk (FD) or an HDD. The optical disk may be a compact disc (CD) or a digital versatile disc (DVD).

The medium reader 96 copies a program or data read from, for example, the record medium 96a to another record medium such as the RAM 92 or the HDD 93. The program read is executed by, for example, the CPU 91. The record medium 96a may be a portable record medium and be used for distributing a program or data. Furthermore, the record medium 96a and the HDD 93 may be referred to as computer readable record media.

The communication interface 97 is connected to a network 97a and communicates with other information processing apparatus via the network 97a. The communication interface 97 may be a wired communication interface connected to a communication device, such as a switch, by a cable or a radio communication interface connected to a base station by a radio link.

The interface 98 communicates with the optimization apparatus 98a. For example, the optimization apparatus 98a is the optimization apparatus 10 according to the first embodiment except the controller 14, the optimization apparatus 20 according to the second embodiment except the controller 14, the optimization apparatus 50 according to the third embodiment except the controller 14, or the optimization apparatus 70 according to the fourth embodiment except the controller 74.

Figure 16:
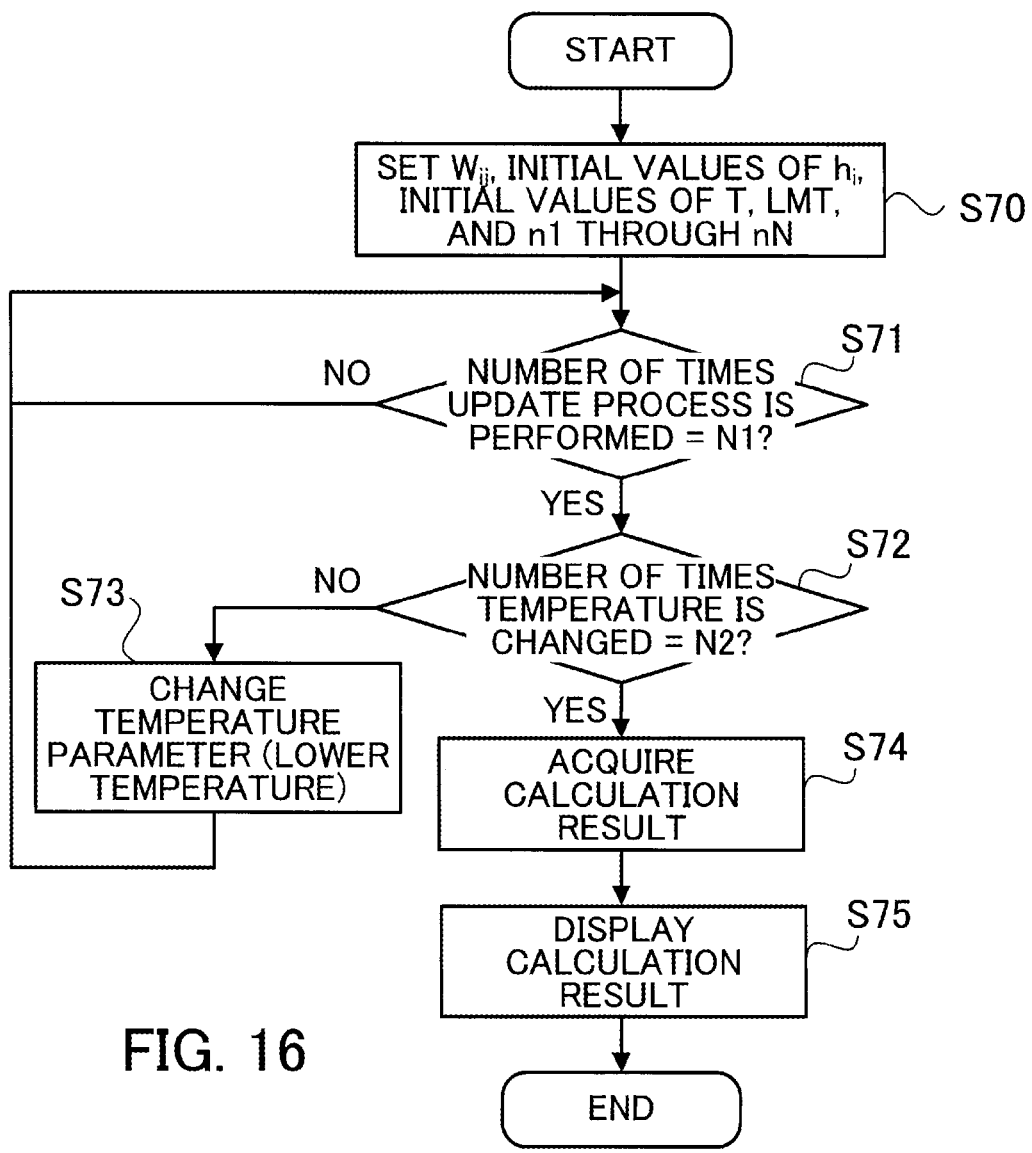
FIG. 16 is a flow chart illustrative of the flow of an example of a method for controlling an optimization apparatus by the control apparatus.

FIG. 16 is a flow chart illustrative of the flow of an example of a method for controlling the optimization apparatus by the control apparatus.

The control apparatus 90 sets weighting coefficients $W_{ij}$, initial values of local fields $h_i$, initial values of a temperature parameter T, and limit information LMT in the optimization apparatus 98a. Furthermore, if the optimization apparatus 98a includes the shift amount holders 73a1 through 73aN illustrated in FIG. 12, then the control apparatus 90 sets the shift amounts n1 through nN (step S70).

After that, the control apparatus 90 receives, for example, a signal which the optimization apparatus 98a transmits each time it performs the above update process. The control apparatus 90 determines whether or not the update process is repeated determined N1 times (step S71). If the update process is not repeated the determined N1 times, then step S71 is repeated.

If the update process is repeated the determined N1 times, then the control apparatus 90 determines whether or not the number of times the temperature parameter T is changed (number of times temperature is changed) has reached determined N2 times (step S72).

If the number of times temperature is changed has not reached the determined N2 times, then the control apparatus 90 changes the temperature parameter T (lowers temperature) (step S73). In step S73, the control apparatus 90 transmits to the optimization apparatus 98a a value of the temperature parameter T smaller than a value transmitted the last time. The determined N1 times, the determined N2 times, and how to change the value of the temperature parameter T (how much the value of the temperature parameter T is decreased at a time, for example) are determined on the basis of annealing conditions. After step S73 is performed, the process is repeated from step S71. The control apparatus 90 may change the magnitude of the shift amounts n1 through nN, for example, after step S73.

If the number of times temperature is changed has reached the determined N2 times, then the control apparatus 90 acquires the state of each neuron (variable $x_i$ (i=1 to N)) at that time as the calculation result of an optimization problem from, for example, the storage section in the state update circuit 13 illustrated in FIG. 1 (step S74).

After that, the control apparatus 90 displays the received calculation result on, for example, the display 94a illustrated in FIG. 15 (step S75) and ends the control of the optimization apparatus 98a.

As stated above, the contents of the process performed by the above control apparatus 90 are realized by making a computer execute a program.

The program may be recorded on a computer readable record medium (record medium 96a, for example). A magnetic disk, an optical disk, a magneto-optical disk, a semiconductor memory, or the like may be used as a computer readable record medium. The magnetic disk may be an FD or an HDD. The optical disk may be a CD, a CD-recordable (R)/rewritable(RW), a DVD, or a DVD-R/RW. The program may be recorded on a portable record medium and be distributed. In that case, the program may be copied from a portable record medium to another record medium (HDD 93, for example) and be executed.

One aspect of the optimization apparatus, the optimization apparatus control method, and the optimization apparatus control program has been described on the basis of the embodiments. However, these embodiments are simple examples and are not limited to the above description.

According to one aspect, an increase in the circuit scale of an optimization apparatus which treats a variable having three or more values is suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization apparatus comprising:
    a plurality of Ising units each including:
        a calculation circuit configured to calculate, among a plurality of neurons which correspond to a plurality of spins included in an Ising model obtained by converting a problem to be calculated and whose states are represented by using variables each having m values (m is a positive integer greater than or equal to 3), two changes in energy of the Ising model caused by a change in a state of a second neuron by $2^n$ (n is an integer greater than or equal to 0) in both of positive and negative directions, based on a state change direction of a first neuron whose state has been updated and a weighting coefficient indicative of a magnitude of an interaction between the first neuron and the second neuron; and
        a state transition determination circuit configured to determine, based on magnitude relationships among a thermal excitation energy determined based on a random number and a temperature parameter and the two changes in energy, whether to allow updates of the state of the second neuron that cause the two changes in energy, to output determination results obtained by determining whether to allow the updates, and to limit an update by which the state of the second neuron exceeds an upper limit value or falls below a lower limit value, wherein the plurality of Ising units each output the determination results regarding different second neurons;
    an update neuron selection circuit configured to select, based on the determination results outputted by each of the plurality of Ising units, one second neuron whose update is allowed and to select the state change direction; and
    a state update circuit configured to update the state of the one second neuron selected by the update neuron selection circuit, based on the state change direction.

2. The optimization apparatus according to claim 1, wherein when the state of the second neuron exceeds the upper limit value or falls below the lower limit value by the change by the $2^n$ in the positive direction or the negative direction, the state transition determination circuit changes a first change in energy, of the two changes in energy, caused by the change in the state of the second neuron by which the state of the second neuron exceeds the upper limit value or falls below the lower limit value to a determined positive value and then determines whether to allow an update of the state of the second neuron that causes the first change in energy.

3. The optimization apparatus according to claim 1, wherein when the state of the second neuron exceeds the upper limit value or falls below the lower limit value by the change by the $2^n$ in the positive direction or the negative direction, the state transition determination circuit changes a first determination result that indicates whether to allow the update by which the state of the second neuron exceeds the upper limit value or falls below the lower limit value, among the determination results obtained by determining whether to allow the updates of the state of the second neuron that cause the two changes in energy, to a value indicating that the update is not allowed.

4. The optimization apparatus according to claim 1, wherein when the state of the first neuron changes by the $2^n$ in the positive direction or the negative direction, the calculation circuit calculates the two changes in energy by using a value obtained by left-shifting the weighting coefficient having a determined bit width by n bits.

5. The optimization apparatus according to claim 1, further comprising:
    a controller configured to individually set values of the n for the plurality of neurons.

6. A method for controlling an optimization apparatus comprising:
    setting, by a control apparatus, a weighting coefficient, an upper limit value, and a lower limit value in the optimization apparatus; and
    controlling, by the control apparatus, a magnitude of a temperature parameter in the optimization apparatus,
    wherein the optimization apparatus includes:
        a plurality of Ising units each including:
            a calculation circuit configured to calculate, among a plurality of neurons which correspond to a plurality of spins included in an Ising model obtained by converting a problem to be calculated and whose states are represented by using variables each having m values (m is a positive integer greater than or equal to 3), two changes in energy of the Ising model caused by a change in a state of a second neuron by $2^n$ (n is an integer greater than or equal to 0) in both of positive and negative directions, based on a state change direction of a first neuron whose state has been updated and the weighting coefficient indicative of a magnitude of an interaction between the first neuron and the second neuron; and
            a state transition determination circuit configured to determine, based on magnitude relationships among a thermal excitation energy determined based on a random number and the temperature parameter and the two changes in energy, whether to allow updates of the state of the second neuron that cause the two changes in energy, to output determination results obtained by determining whether to allow the updates, and to limit an update by which the state of the second neuron exceeds the upper limit value or falls below the lower limit value, wherein the plurality of Ising units each output the determination results regarding different second neurons;

an update neuron selection circuit configured to select, based on the determination results outputted by each of the plurality of Ising units, one second neuron whose update is allowed and to select the state change direction; and a state update circuit configured to update the state of the one second neuron selected by the update neuron selection circuit, based on the state change direction.

7. A non-transitory computer-readable storage medium storing a program for controlling an optimization apparatus that causes a computer to execute a process comprising:

setting a weighting coefficient, an upper limit value, and a lower limit value in the optimization apparatus; and controlling a magnitude of a temperature parameter in the optimization apparatus, wherein the optimization apparatus includes:

a plurality of Ising units each including:

a calculation circuit configured to calculate, among a plurality of neurons which correspond to a plurality of spins included in an Ising model obtained by converting a problem to be calculated and whose states are represented by using variables each having m values (m is a positive integer greater than or equal to 3), two changes in energy of the Ising model caused by a change in a state of a second neuron by $2^n$ (n is an integer greater than or equal to 0) in both of positive and negative directions, based on a state change direction of a first neuron whose state has been updated and the weighting coefficient indicative of a magnitude of an interaction between the first neuron and the second neuron; and a state transition determination circuit configured to determine, based on magnitude relationships among a thermal excitation energy determined based on a random number and the temperature parameter and the two changes in energy, whether to allow updates of the state of the second neuron that cause the two changes in energy, to output determination results obtained by determining whether to allow the updates, and to limit an update by which the state of the second neuron exceeds the upper limit value or falls below the lower limit value, wherein the plurality of Ising units each output the determination results regarding different second neurons;

an update neuron selection circuit configured to select, based on the determination results outputted by each of the plurality of Ising units, one second neuron whose update is allowed and to select the state change direction; and a state update circuit configured to update the state of the one second neuron selected by the update neuron selection circuit, based on the state change direction.

\* \* \* \* \*